US011388322B2

(12) United States Patent
Jeong et al.

(10) Patent No.: US 11,388,322 B2
(45) Date of Patent: Jul. 12, 2022

(54) CAMERA MODULE HAVING ROTATABLE LENS MODULE AND FRAMES AND PORTABLE ELECTRONIC DEVICE INCLUDING THE SAME

(71) Applicant: SAMSUNG ELECTRO-MECHANICS CO., LTD., Suwon-si (KR)

(72) Inventors: Dae Hyun Jeong, Suwon-si (KR); Jong Ki Kim, Suwon-si (KR); Dong Yeon Shin, Suwon-si (KR); Gab Yong Kim, Suwon-si (KR); Oh Byoung Kwon, Suwon-si (KR); Jong In Lee, Suwon-si (KR); Kwang Chun Jung, Suwon-si (KR); Seung Hyeon Jeong, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/126,356

(22) Filed: Dec. 18, 2020

(65) Prior Publication Data

US 2021/0250475 A1    Aug. 12, 2021

(30) Foreign Application Priority Data

Feb. 7, 2020  (KR) .................. 10-2020-0015291
Sep. 9, 2020  (KR) .................. 10-2020-0115632

(51) Int. Cl.
*H04N 5/225* (2006.01)

(52) U.S. Cl.
CPC ......... *H04N 5/2254* (2013.01); *H04N 5/2253* (2013.01); *H04N 5/2257* (2013.01); *H04N 5/2259* (2013.01)

(58) Field of Classification Search
CPC .. H04N 5/2254; H04N 5/2253; H04N 5/2257; H04N 5/2259; G03B 5/02; G03B 5/08
See application file for complete search history.

(56) References Cited

U.S. PATENT DOCUMENTS 10,175,499 B2   1/2019  Howarth et al.
2015/0103240 A1   4/2015  Kim et al.
(Continued)

FOREIGN PATENT DOCUMENTS

CN   104508550 A   4/2015
CN   104570551 A   4/2015
(Continued)

OTHER PUBLICATIONS

First Examination Report dated Jan. 3, 2022, in counterpart Indian Patent Application No. 202014056949 (5 pages in English).
(Continued)

*Primary Examiner* — Padma Haliyur
(74) *Attorney, Agent, or Firm* — NSIP Law

(57) ABSTRACT

A camera module includes a lens module; a first frame accommodating the lens module; a second frame accommodating the first frame; a third frame accommodating the second frame; and a housing accommodating the third frame. The lens module and the first frame are configured to rotate with respect to the second frame around an optical axis. The lens module, the first frame and the second frame are configured to rotate with respect to the third frame around a first axis that is perpendicular to the optical axis. The lens module, the first frame, the second frame, and the third frame are configured to rotate with respect to the housing around a second axis that is perpendicular to both the optical axis and the first axis.

23 Claims, 23 Drawing Sheets

(56) References Cited

U.S. PATENT DOCUMENTS

| | | | |
|---|---|---|---|
| 2015/0195459 A1 | 7/2015 | Yeo | |
| 2015/0296143 A1* | 10/2015 | Kang | G03B 3/10 |
| | | | 348/208.11 |
| 2016/0173757 A1 | 6/2016 | Choi | |
| 2017/0139225 A1* | 5/2017 | Lim | G02B 7/08 |
| 2018/0059512 A1* | 3/2018 | Rho | G03B 17/14 |
| 2019/0049687 A1* | 2/2019 | Bachar | G02B 13/0065 |
| 2020/0400464 A1* | 12/2020 | Yedid | H04N 5/2258 |

FOREIGN PATENT DOCUMENTS

| | | | |
|---|---|---|---|
| EP | 3 239 758 A1 | 11/2017 | |
| JP | 2019-200270 A | 11/2019 | |
| KR | 10-2016-0072687 A | 6/2016 | |
| KR | 10-2018-0127698 A | 11/2018 | |
| KR | 10-2009197 B1 | 8/2019 | |
| KR | 10-2020-0013020 A | 2/2020 | |
| WO | WO-2019207464 A2 * | 10/2019 | G01D 5/145 |

OTHER PUBLICATIONS

Chinese Office Action dated Feb. 7, 2022, in counterpart Chinese Patent Application No. 202110159207.3 (9 pages in English and 8 pages in Chinese).

Notice of Reason for Rejection dated Nov. 25, 2021, in counterpart Korean Patent Application No. 10-2020-0115632 (5 pages in English and 4 pages in Korean).

* cited by examiner

I-I'

CAMERA MODULE HAVING ROTATABLE LENS MODULE AND FRAMES AND PORTABLE ELECTRONIC DEVICE INCLUDING THE SAME

CROSS-REFERENCE TO RELATED APPLICATIONS

This application claims the benefit under 35 USC 119(a) of Korean Patent Application No. 10-2020-0015291 filed on Feb. 7, 2020 and Korean Patent Application No. 10-2020-0115632 filed on Sep. 9, 2020 in the Korean Intellectual Property Office, the entire disclosures of which are incorporated herein by reference for all purposes.

BACKGROUND

1. Field

The following description relates to a camera module and a portable electronic device including the same.

2. Description of Related Art

Camera modules have been adopted in mobile communication terminals such as smartphones, tablet PCs, and notebook computers.

In addition, a camera module may be provided with an actuator moving the lens module for focus adjustment and shaking correction, and the actuator may move the lens module in the optical axis direction and in a direction perpendicular to the optical axis by driving force of a magnet and a coil.

However, since shaking occurring in the camera module does not always occur in a direction perpendicular to the optical axis, there is a limit to shaking correction when the lens module is moved in a direction perpendicular to the optical axis.

In detail, there is a problem that it may be difficult to precisely correct shaking when shaking occurs continuously, such as when shooting a video.

In addition, when a subject to be imaged moves while capturing a video, there may be inconvenience in that the user must directly move the mobile communication terminal to adjust the imaging direction of the camera module with regard to a moving subject.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Examples provide a camera module capable of tracking a moving subject and correcting shaking, and a portable electronic device including the same.

In one general aspect, a camera module includes a lens module; a first frame accommodating the lens module; a second frame accommodating the first frame; a third frame accommodating the second frame; and a housing accommodating the third frame. The lens module and the first frame are configured to rotate with respect to the second frame around an optical axis. The lens module, the first frame and the second frame are configured to rotate with respect to the third frame around a first axis that is perpendicular to the optical axis. The lens module, the first frame, the second frame, and the third frame are configured to rotate with respect to the housing around a second axis that is perpendicular to both the optical axis and the first axis.

The camera module may include a first guide portion disposed between the first frame and the second frame, and the first guide portion may include a first receiving groove disposed in the first frame, a first guide groove disposed in the second frame, and a first ball member disposed between the first receiving groove and the first guide groove.

An inner wall of at least one of the first receiving groove and the first guide groove may have a rounded shape and a length in a rotation direction of the first frame.

The camera module may include a first driving unit configured to provide driving force to the first frame, and the first driving unit may include a first magnet disposed on an image side of the first frame, a first coil facing the first magnet in a direction of the optical axis, and a first substrate on which the first coil is disposed.

The first magnet may have an inner surface facing the optical axis and an outer surface opposite to the inner surface, and the inner surface and the outer surface may have a rounded shape. The first coil may have an inner portion facing the optical axis and an outer portion opposite the inner portion, and the inner portion and the outer portion may have a rounded shape.

The camera module may include a first position measuring unit disposed to face the first magnet, and the first position measuring unit may include a plurality of pattern coils bent respectively and repeatedly.

The first substrate may include a connection portion connected to an image sensor unit disposed on the image side of the first frame and having a bent shape.

The camera module may include a second guide portion disposed between the second frame and the third frame, and the second guide portion may include a second receiving groove disposed in the second frame, a second guide groove disposed in the third frame, and a second ball member disposed between the second receiving groove and the second guide groove. The second guide portion may be provided as a pair of second guide portions disposed on opposite sides of the optical axis.

Each of the second receiving groove and the second guide groove may have a length in a rotation direction of the second frame and has a rounded shape.

The second ball member may include at least one first ball member disposed on a first side of the first axis and at least one second ball member disposed on a second side of the first axis.

The second ball member may be disposed on an arc of a circle centered on the first axis.

The camera module may include a second driving unit configured to provide driving force to the second frame, and the second driving unit may include a second magnet disposed on the second frame, a second coil facing the second magnet in a direction perpendicular to the optical axis, and a second substrate on which the second coil is disposed.

The second substrate may be bent a plurality of times.

The camera module may include a third guide portion disposed between the third frame and the housing, and the third guide portion may include a third receiving groove disposed on the third frame, a third guide groove disposed in the housing, and a third ball member disposed between the third receiving groove and the third guide groove. The third guide portion may be provided as a pair of third guide portions disposed on opposite sides of the optical axis.

Each of the third receiving groove and the third guide groove may have a length in a rotation direction of the third frame with the second axis and has a rounded shape.

The third ball member may include at least one first ball member disposed on a first side of the second axis and at least one second ball member disposed on a second side of the second axis.

The third ball member may be disposed on an arc of a circle centered on the second axis.

The camera module may include a third driving unit configured to provide driving force to the third frame, and the third driving unit may include a third magnet disposed on the third frame, a third coil facing the third magnet in a direction perpendicular to the optical axis, and a third substrate on which the third coil is disposed.

In another general aspect, a portable electronic device includes a first camera module; and a second camera module spaced apart from the first camera module. An angle of view of the first camera module is narrower than an angle of view of the second camera module. The first camera module includes a lens module; a first frame accommodating the lens module and configured to rotate together with the lens module with respect to an optical axis; a second frame accommodating the first frame and configured to rotate together with the first frame with respect to a first axis that is perpendicular to the optical axis; a third frame accommodating the second frame and configured to rotate together with the second frame with respect to a second axis that is perpendicular to both the optical axis and the first axis; and a housing accommodating the third frame.

In another general aspect, a camera module includes a lens module; a first frame accommodating the lens module and configured to rotate together with the lens module around a first axis by virtue of a first set of ball members; a second frame accommodating the first frame and configured to rotate together with the lens module and the first frame around a second axis by virtue of a second set of ball members; a third frame accommodating the second frame and configured to rotate together with the lens module, the first frame, and the second frame around a third axis by virtue of a third set of ball members; and a housing accommodating the third frame.

The first axis may perpendicular to the second axis and the third axis, the second axis may be perpendicular to the third axis, and one of the first axis, the second axis, and the third axis may be an optical axis of the lens module.

The second set of ball members may be configured to roll between at least two curved outer surfaces of the second frame and two corresponding inner surfaces of the third frame.

The third set of ball members may be configured to roll between at least two curved outer surfaces of the third frame and two corresponding inner surfaces of the housing.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
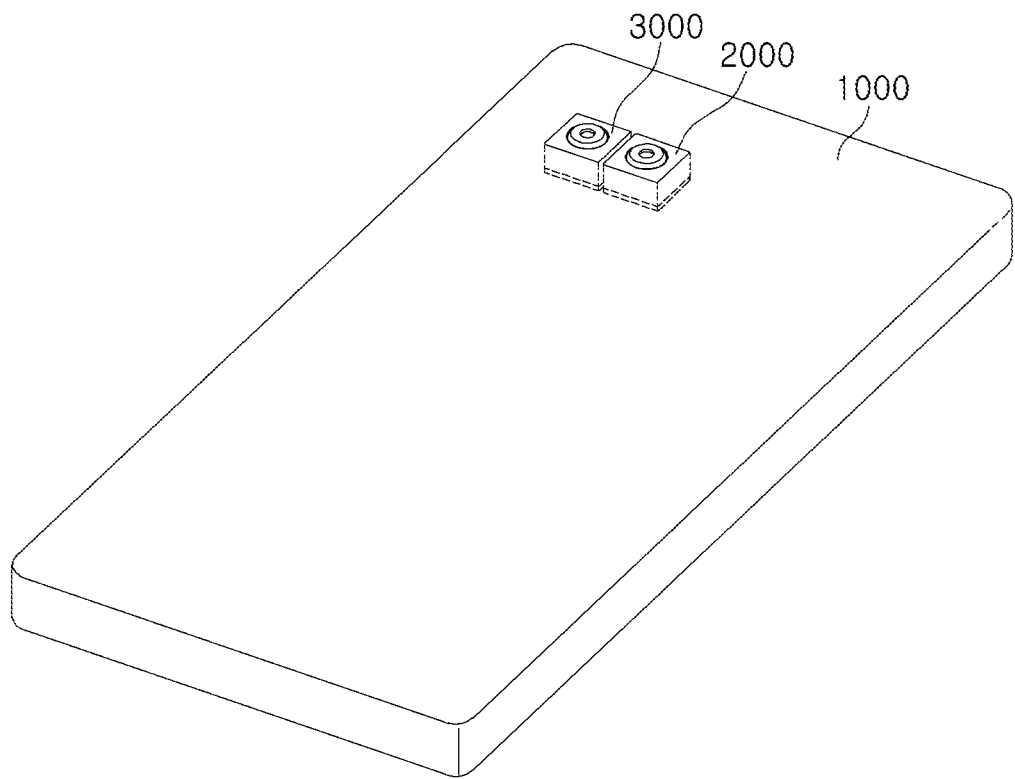
FIG. 1 is a perspective view of a portable electronic device according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Figure 2:
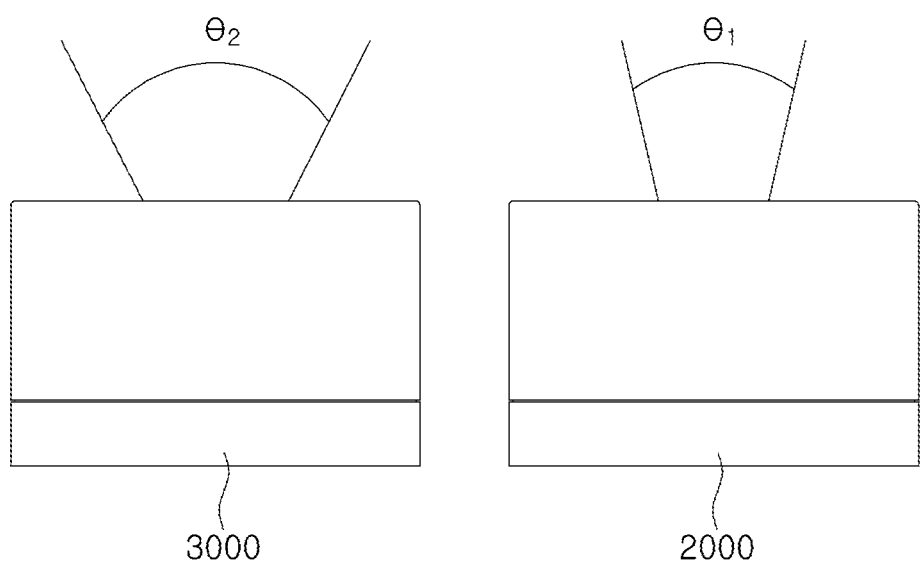
FIG. 2 is a side view of a plurality of camera modules mounted in a portable electronic device.

FIG. 1 is a perspective view of a portable electronic device according to an example, and FIG. 2 is a side view of a plurality of camera modules mounted in the portable electronic device.

A portable electronic device 1000 may be a portable electronic device such as a mobile communication terminal, a smartphone, or a tablet PC.

As illustrated in FIG. 1, a plurality of camera modules is mounted in the portable electronic device 1000 to capture an image of a subject. For example, the portable electronic device may include a first camera module 2000 and a second camera module 3000.

The first camera module 2000 and the second camera module 3000 are configured to have different angles of view.

The first camera module 2000 is configured with a relatively narrow angle of view (e.g., telephoto), and the second camera module 3000 is configured with a relatively wide angle of view (e.g., wide angle).

For example, an angle of view Θ1 of the first camera module 2000 may be formed in the range of 9° to 35°, and an angle of view Θ2 of the second camera module 3000 may be formed in the range of 60° to 120°.

By designing different angles of view of the two camera modules as described above, an image of a subject may be imaged at various depths.

On the other hand, the portable electronic device 1000 according to an example may have a Picture in Picture (PIP) function.

For example, the portable electronic device 1000 may display an image captured by a camera module (e.g., the first camera module 2000) having a relatively narrower field of view, in an image captured by a camera module (e.g., the second camera module 3000) having a relatively wider field of view.

For example, a subject of interest may be imaged with a relatively narrow angle of view (thus, there is an effect that the subject of interest is enlarged) and displayed in an image imaged with a relatively wide angle of view.

When shooting a video, since the subject of interest may move, an optical axis (a Z axis) may rotate so that the subject of interest may be imaged by the camera module (for example, the first camera module 2000) having a narrower angle of view.

For example, the first camera module 2000 may rotate and move a lens module by tracking a movement of a subject of interest.

For example, the lens module provided in the first camera module 2000 may be rotated based on an optical axis (Z axis), a first axis (X axis), and a second axis (Y axis).

In addition, the lens module provided in the first camera module 2000 is rotated based on the optical axis (Z axis), the first axis (X axis), and the second axis (Y axis) to correct shaking that may occur during shooting.

In this case, the first axis (X axis) means an axis, perpendicular to the optical axis (Z axis), and the second axis (Y axis) means an axis perpendicular to both the optical axis (Z axis) and the first axis (X axis). In addition, the first axis (X axis) and the second axis (Y axis), which are rotation axes of the first camera module 2000, may intersect with the optical axis (Z axis), and the optical axis (Z axis) and the first axis (X Axis) and the second axis (Y axis) may meet at any one point.

Hereinafter, the first camera module 2000 will be described in detail with reference to FIGS. 3 to 23.

Referring to FIGS. 3 to 23, the first camera module 2000 may be referred to as a 'camera module.'

Figure 3:
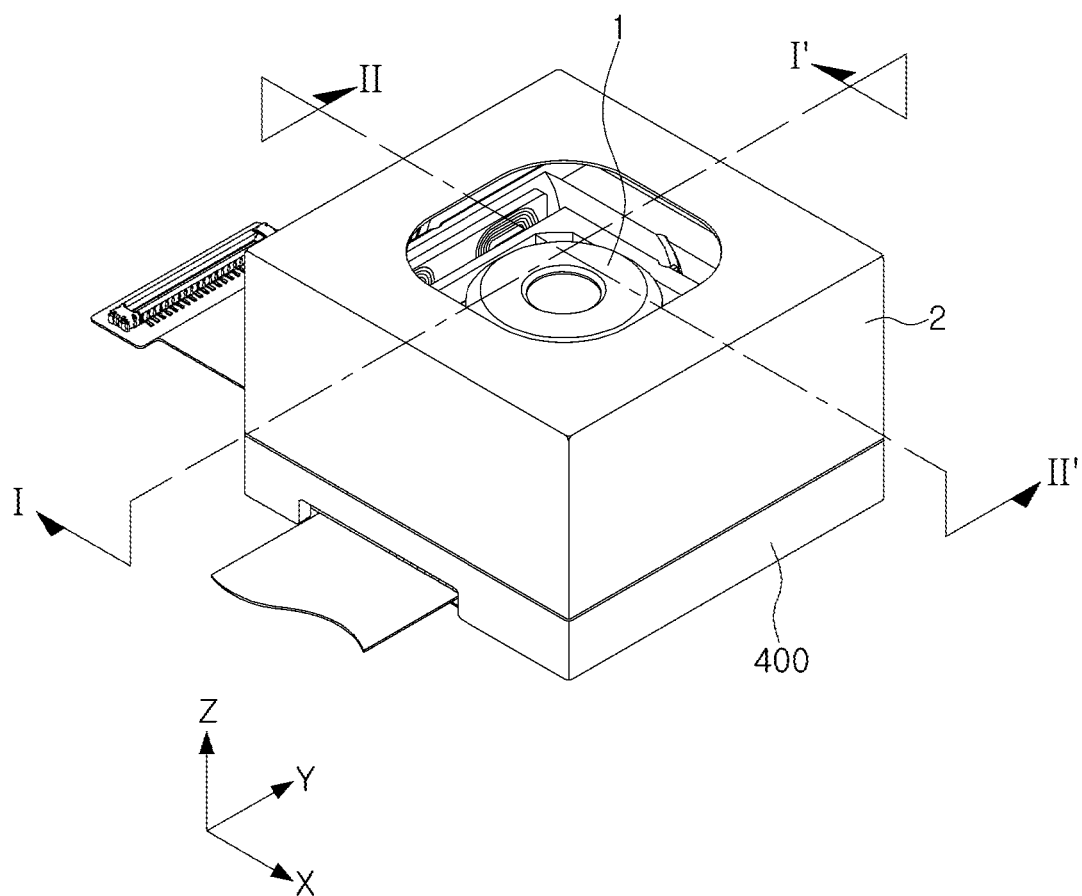
FIG. 3 is a perspective view of a camera module according to an example.
Figure 4:
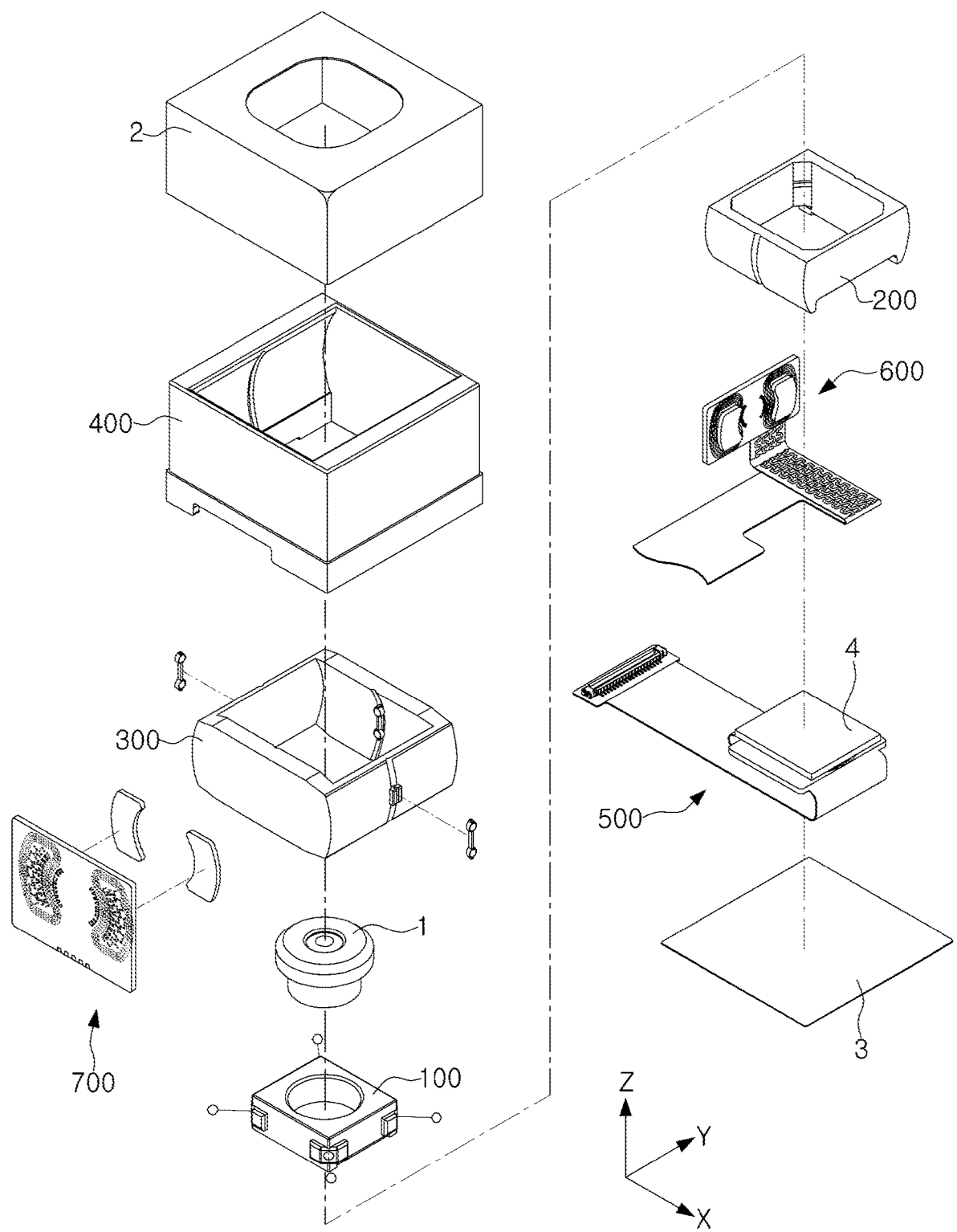
FIG. 4 is an exploded perspective view of a camera module according to an example.

FIG. 3 is a perspective view of a camera module according to an example, and FIG. 4 is an exploded perspective view of the camera module according to an example.

Referring to FIGS. 3 and 4, the camera module 2000 according to an example includes a lens module 1, a first frame 100, a second frame 200, a third frame 300, a housing 400 and a case 2. The camera module may also include a first driving unit 500, a second driving unit 600, and a third driving unit 700.

The lens module 1 may be a lens barrel, but is not limited thereto. For example, the lens module 1 may be in a form in which a lens barrel and a carrier are combined.

At least one lens for photographing a subject may be accommodated in the lens module 1. When a plurality of lenses is disposed, the plurality of lenses are mounted inside the lens module 1 along the optical axis (Z axis). The lens module 1 may have a hollow cylindrical shape.

The lens module 1 is accommodated in the first frame 100. The first frame 100 may have a box shape in which upper and lower portions are open.

The lens module 1 may be moved in the direction of the optical axis (Z axis). For example, the lens module 1 may be moved relative to the first frame 100 in the optical axis (Z axis) direction.

For example, the lens module 1 may be moved in the optical axis (Z axis) direction with respect to the first frame 100 to adjust the focus.

To move the lens module 1 in the optical axis (Z axis) direction, a piezoelectric actuator or an actuator including a magnet and a coil may be used. For example, a magnet may be provided in the lens module 1, and a coil may be provided in the first frame 100.

An image sensor unit 4 may be coupled to the lower portion of the first frame 100. The image sensor unit 4 includes an image sensor and a printed circuit board.

The first frame 100 may be rotated (roll) based on the optical axis (Z axis), and accordingly, the lens module 1 accommodated in the first frame 100 may also be rotated using the optical axis (Z axis) as a rotation axis, which will be described later with reference to FIGS. 5 to 12.

The lens module 1 and the first frame 100 are accommodated in the second frame 200. The second frame 200 may have a box shape in which upper and lower portions are open.

The second frame 200 may be rotated (pitching) based on the first axis (X axis) perpendicular to the optical axis (Z axis), and accordingly, the first frame 100 and the lens module 1 accommodated inside the second frame 200 may also be rotated along with the second frame 200 using the first axis (X axis) as a rotation axis, which will be described later with reference to FIGS. 13 to 18.

The lens module 1, the first frame 100 and the second frame 200 are accommodated in the third frame 300. The third frame 300 may have a box shape in which upper and lower portions are open.

The third frame 300 may be rotated (yaw) based on the second axis (Y axis) perpendicular to the optical axis (Z axis) and the first axis (X axis), and accordingly, the second frame 200, the first frame 100, and the lens module 1 accommodated in the third frame 300 may also be rotated along with the third frame 300 using the second axis (Y axis) as a rotation axis, which will be described later with reference to FIGS. 19 to 23.

The case 2 is coupled to the housing 400 to cover the housing 400. In addition, a cover 3 may be coupled to the lower portion of the housing 400.

Figure 5:
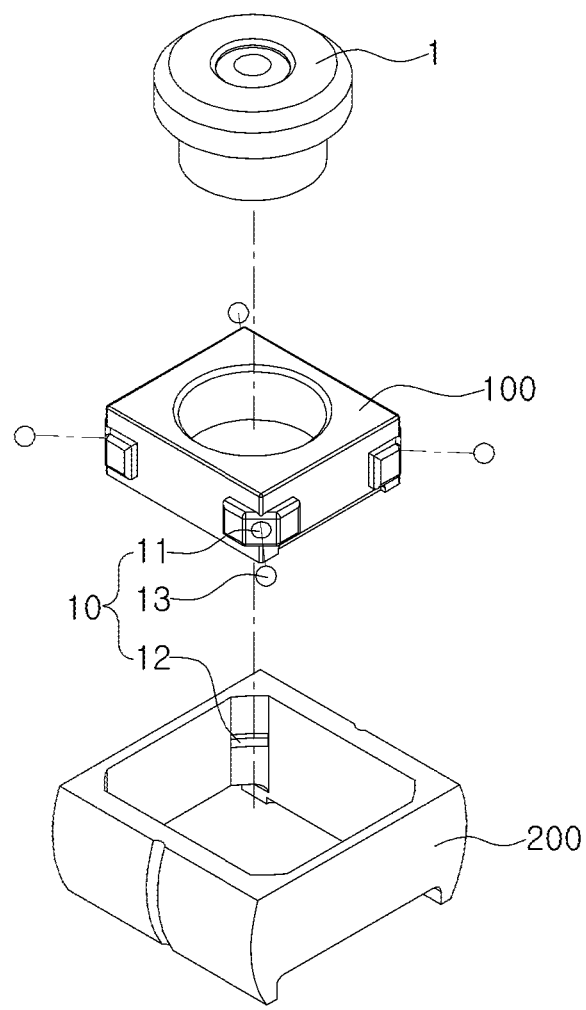
FIG. 5 is an exploded perspective view of a lens module, a first frame, and a second frame.
Figure 6:
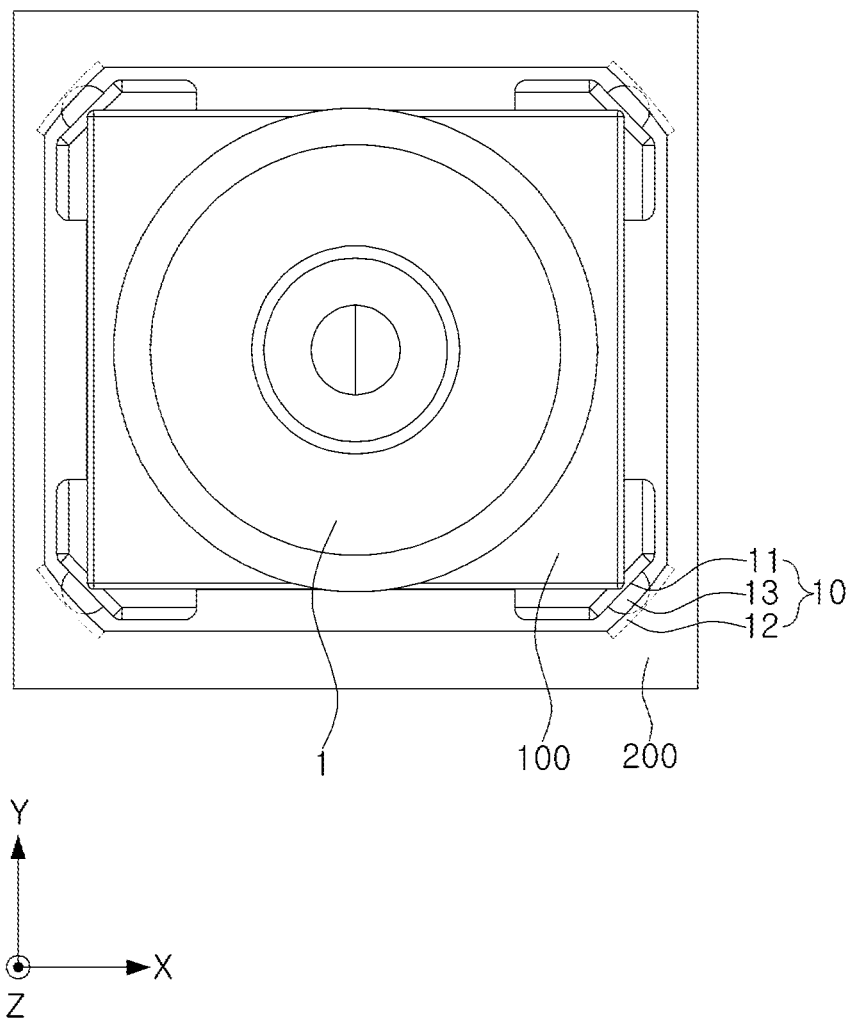
FIG. 6 is a plan view of a lens module, a first frame, and a second frame which are combine.

FIG. 5 is an exploded perspective view of a lens module, a first frame, and a second frame, and FIG. 6 is a plan view illustrating a state in which the lens module, the first frame, and the second frame are combined.

Figure 7A:
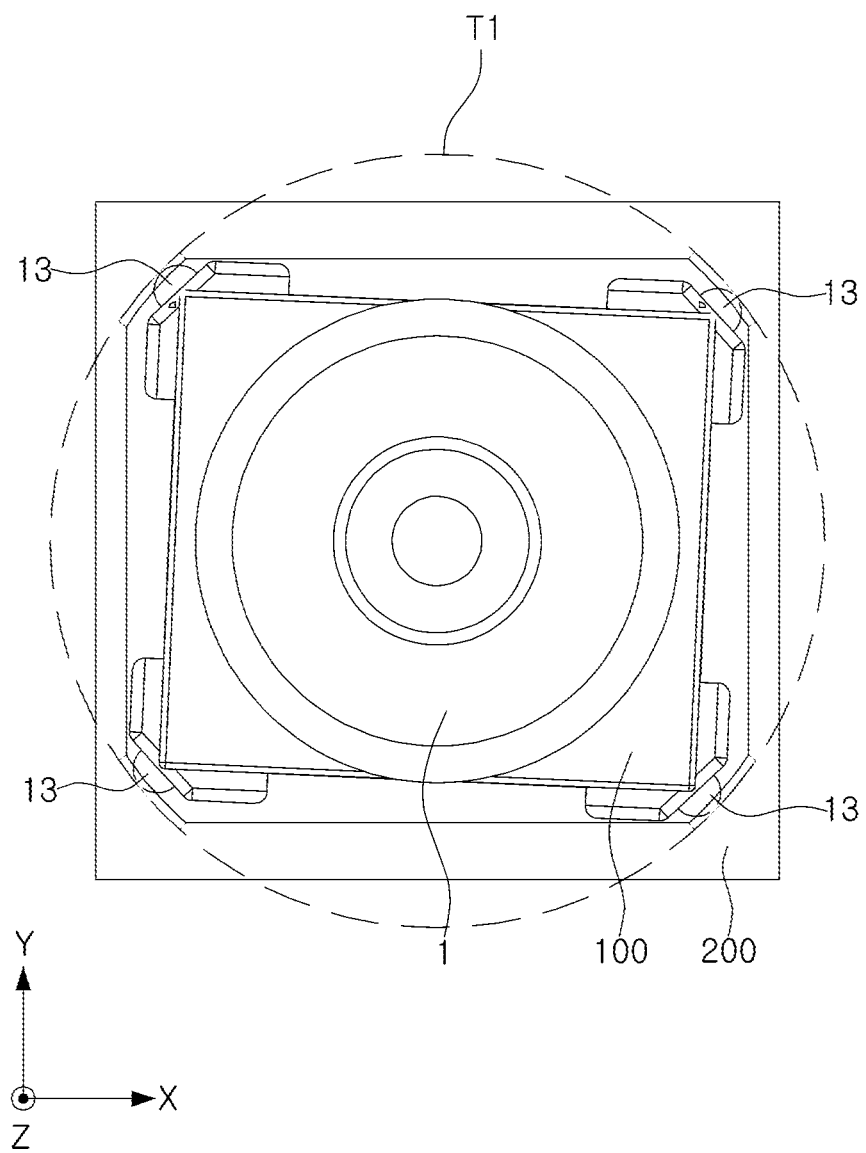
FIGS. 7A and 7B are views illustrating a state in which the lens module and the first frame are rotated.
Figure 7B:
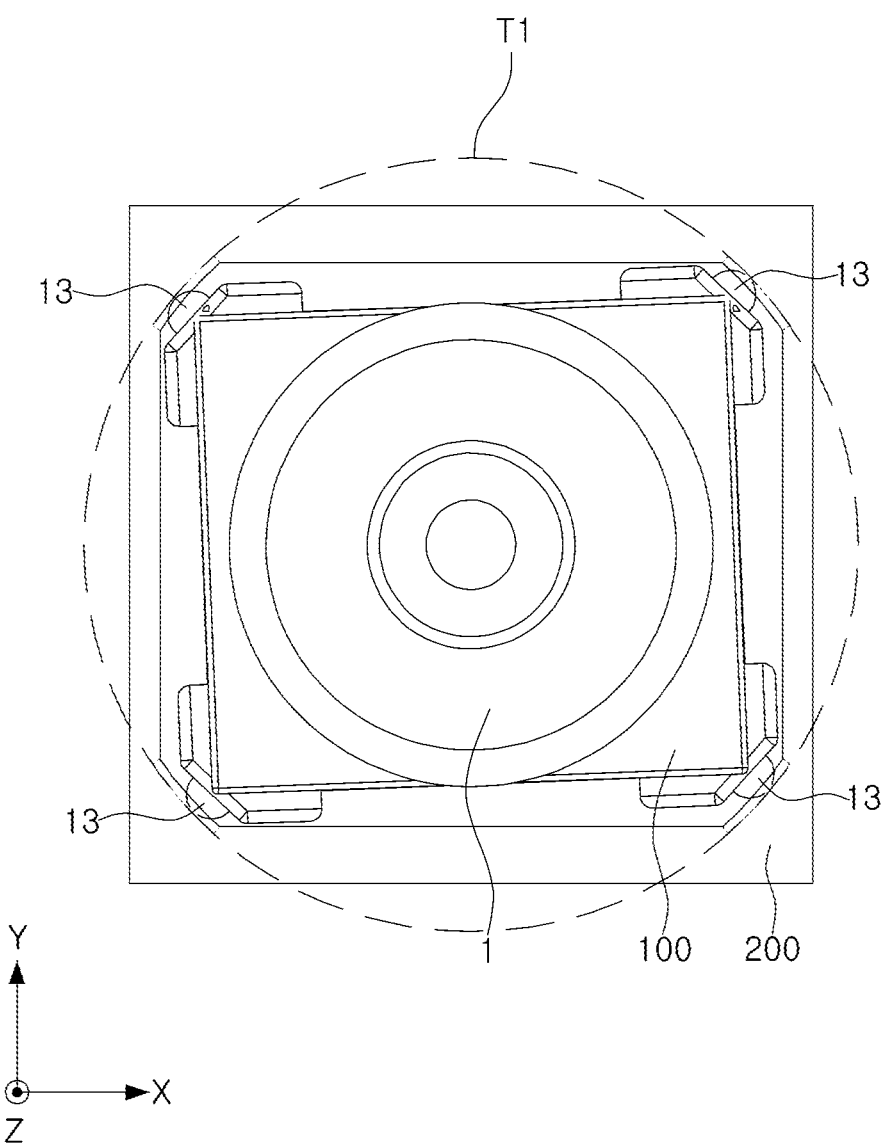

FIGS. 7A and 7B are views illustrating a state in which the lens module and the first frame are rotated.

Figure 8:
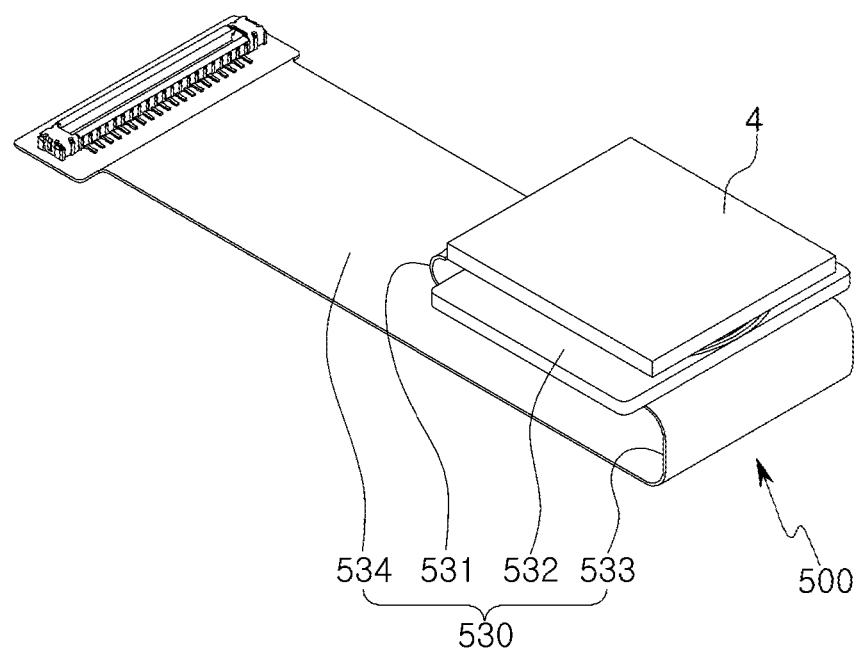
FIG. 8 is a perspective view of a first driving unit.
Figure 9:
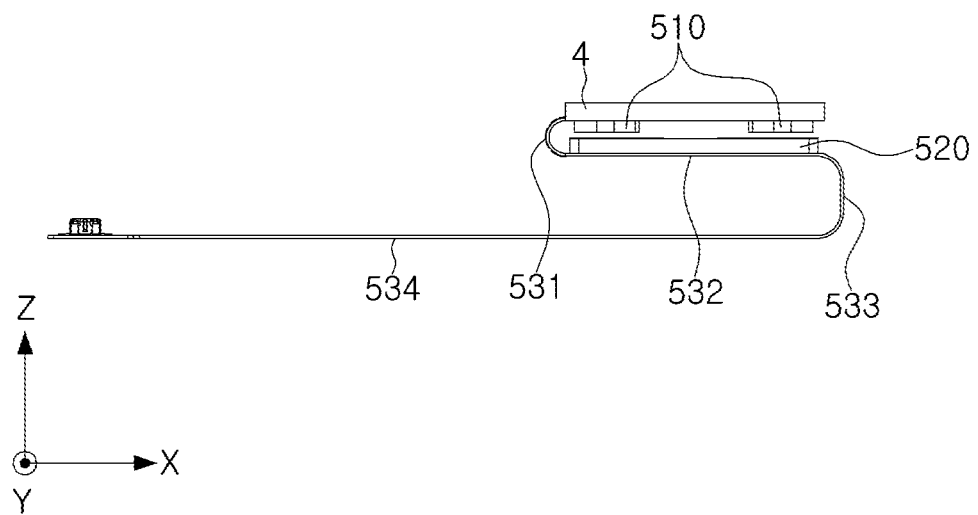
FIG. 9 is a side view of FIG. 8.
Figure 10:
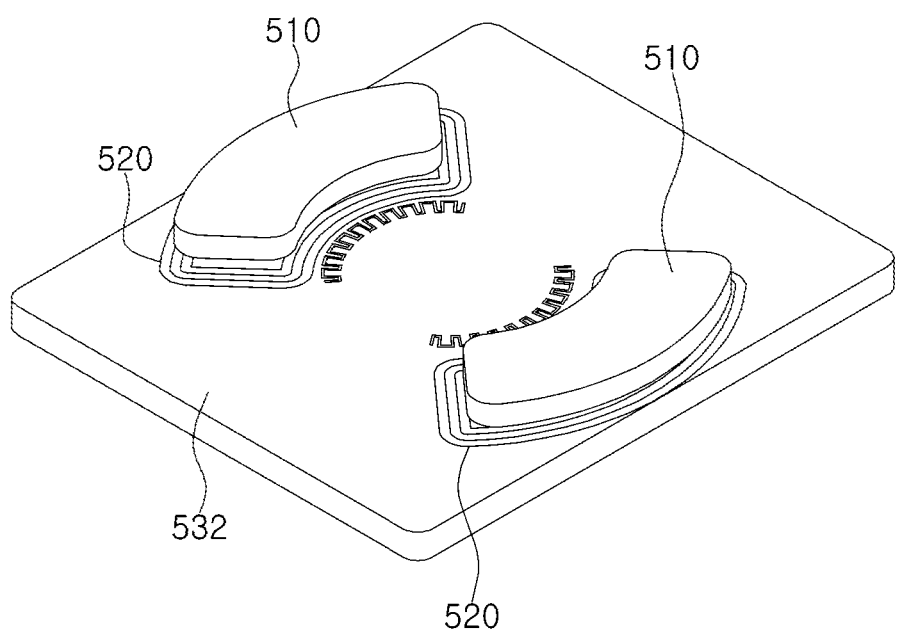
FIG. 10 is a perspective view of a first magnet and a first coil.

FIG. 8 is a perspective view of a first driving unit, FIG. 9 is a side view of FIG. 8, and FIG. 10 is a perspective view of a first magnet and a first coil.

Figure 11:
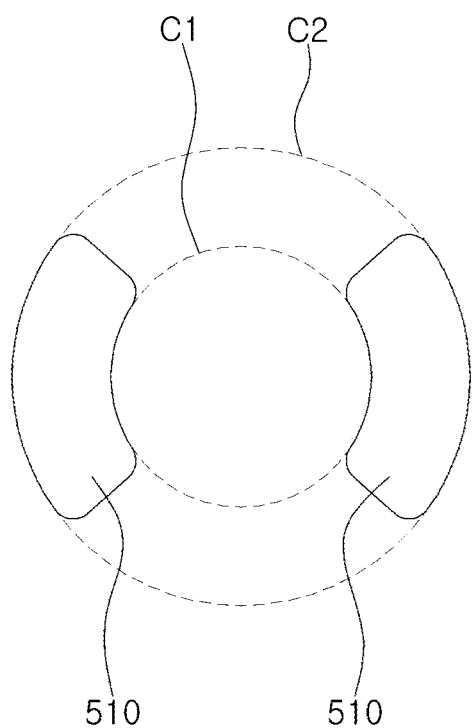
FIG. 11 is a plan view of the first magnet.
Figure 12:
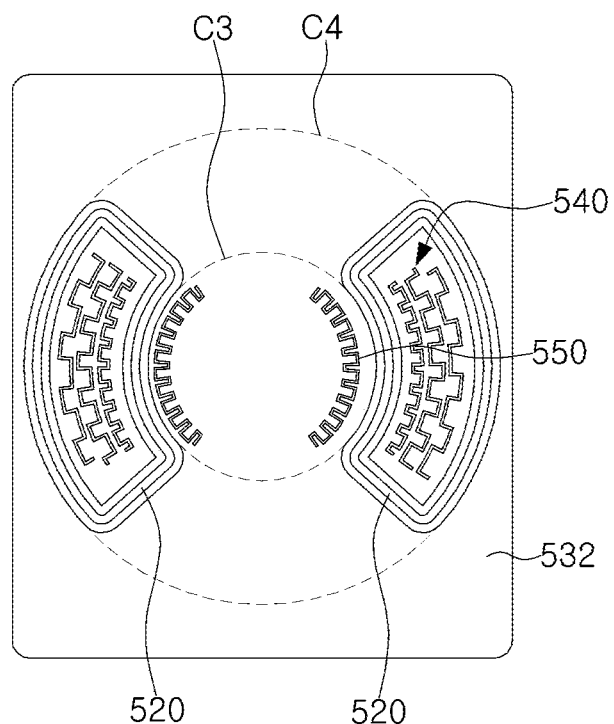
FIG. 12 is a plan view of the first coil.

FIG. 11 is a plan view of the first magnet, and FIG. 12 is a plan view of the first coil.

With reference to FIGS. 5 to 12, a rotational motion (rolling) of the lens module 1 and the first frame 100 based on the optical axis (Z axis) will be described.

The lens module 1 is accommodated in the first frame 100, and the first frame 100 is accommodated in the second frame 200.

The first frame 100 is provided to be able to rotate relative to the second frame 200. Since the lens module 1 is accommodated in the first frame 100, the lens module 1 is also rotated by the rotation of the first frame 100. For example, the lens module 1 is rotated together with the first frame 100.

The lens module 1 and the first frame 100 are provided to be able to rotate relative to the second frame 200. For example, the lens module 1 and the first frame 100 may be rotatably supported with respect to the second frame 200. For example, the lens module 1 and the first frame 100 may be rotated (roll) based on the optical axis (Z axis). For example, the first frame 100 may be rotated relative to the second frame 200 using the optical axis (Z axis) as a rotation axis.

The rotation range of the lens module 1 and the first frame 100 may be ±10°. In detail, the rotation range of the lens module 1 and the first frame 100 may be ±5°. In more detail, the rotation range of the lens module 1 and the first frame 100 may be ±3°.

A first guide portion 10 is provided between the first frame 100 and the second frame 200 to guide the rotational motion of the first frame 100.

The first guide portion 10 includes a first receiving groove 11, a first guide groove 12 and a first ball member 13.

The first receiving groove 11 is provided in the outer surface of the first frame 100. For example, the first receiving groove 11 may be provided in respective corner areas of the outer surface of the first frame 100.

The first guide groove 12 is provided in the inner side of the second frame 200. For example, the first guide groove 12 may be provided in each corner area of the inner surface of the second frame 200.

The first ball member 13 is disposed between the first receiving groove 11 and the first guide groove 12. One side of the first ball member 13 is in contact with the first receiving groove 11 and the other side is in contact with the first guide groove 12.

The first ball member 13 includes a plurality of ball members. As an example, the first ball member 13 may include four ball members. However, the configuration is not limited thereto, and the first ball member 13 may include at least three ball members.

The first ball member 13 is inserted and disposed in the first receiving groove 11 of the first frame 100. The first ball member 13 is disposed to protrude from the first receiving groove 11.

The first ball member 13 is provided to be rotatable with respect to the first receiving groove 11.

The first guide groove 12 has a length in a rotation direction of the lens module 1 and the first frame 100, for example, along an arc of a circle having an optical axis (Z axis) as a rotation axis, and has a rounded shape.

For example, the inner wall of the first guide groove 12 in contact with the first ball member 13 has a curvature. The distance between the inner wall of the first guide groove 12 in contact with the first ball member 13 and the optical axis (Z axis) may be constant.

The first ball member 13 may be rolled with respect to the first guide groove 12.

Accordingly, as illustrated in FIGS. 7A and 7B, the lens module 1 and the first frame 100 may be guided by the first guide portion 10 and may be rotated about the optical axis (Z axis).

In the present example, it is described that the first ball member 13 is capable of rotating with respect to the first receiving groove 11 and capable of rolling with respect to the first guide groove 12, but the configuration is not limited thereto. For example, the first ball member 13 may be provided to be capable of rolling with respect to the first receiving groove 11 and capable of rotating with respect to the first guide groove 12.

Alternatively, the first ball member 13 may be provided to enable a rolling motion with respect to both the first receiving groove 11 and the first guide groove 12.

Alternatively, the first ball member 13 may be fixed to the first receiving groove 11 to slide with respect to the first guide groove 12.

An inner wall of at least one of the first receiving groove 11 and the first guide groove 12 may have a length in the rotation direction of the first frame 100 with the optical axis (Z axis) as a rotation axis, and may have a rounded shape.

On the other hand, the first ball member 13 is located on the rotational trajectory of the first frame 100. For example, all of the plurality of ball members of the first ball member 13 may be located on one rotation trajectory T1 of the first frame 100 (see FIGS. 7A and 7B).

The plurality of ball members of the first ball member 13 are to be provided on the rotation axis of the first frame 100, for example, on a circle present on a plane perpendicular to the optical axis (Z axis) while being centered on the optical axis (Z axis).

A first driving unit 500 provides driving force to the first frame 100. Referring to FIGS. 8 to 12, the first driving unit 500 includes a first magnet 510, a first coil 520, and a first substrate 530.

The first magnet 510 is provided below the first frame 100. For example, the first magnet 510 may be provided on a lower surface of the image sensor unit 4 (printed circuit board) coupled to the first frame 100. The first magnet 510 may be provided as one or two or more of first magnets 510.

For example, the first magnet 510 may include one or two magnets spaced apart from each other. In the case of including two magnets, the two magnets may be spaced apart in a direction perpendicular to the optical axis (Z axis).

The first coil 520 may be provided on the first substrate 530 to face the first magnet 510. The first coil 520 may be a copper foil pattern stacked and embedded in the first substrate 530.

This is because forming an arc shape having an accurate curvature in the inner and outer sides of the coil is difficult with a general winding coil.

The first coil 520 may include one or two coils spaced apart from each other. Hereinafter, a case including two magnets and two coils will be described as an example.

The first magnet 510 and the first coil 520 are disposed to face each other in the optical axis (Z axis) direction.

Driving force is generated in a direction perpendicular to the optical axis (Z axis) due to the electromagnetic influence between the first magnet 510 and the first coil 520.

Accordingly, the first frame 100 may be rotated about the optical axis (Z axis) by the driving force of the first driving unit 500. Since the lens module 1 is accommodated in the first frame 100, the lens module 1 may also be rotated together with the first frame 100 as the first frame 100 is rotated.

When the first frame 100 is rotated about the optical axis (Z axis), the first magnet 510 is a moving member that rotates together with the first frame 100, and the first coil 520 is a fixing member.

However, the configuration is not limited thereto, and positions of the first magnet 510 and the first coil 520 may be changed.

Since the first magnet 510 is rotated, when the first magnet 510 has a rectangular planar shape, the relative position of the first magnet 510 with respect to the first coil 520 is changed, and thus, it may be difficult to provide constant driving force.

Accordingly, in this example, the first magnet 510 may have a rounded shape, in detail, an arc shape. For example, an inner surface (a surface facing the optical axis (Z axis)) and an outer surface (a surface opposite to the inner surface) of the first magnet 510 may be rounded (see FIGS. 10 and 11). The first magnet 510 may have an outer surface having a length longer than that of an inner surface.

Each inner surface of the two magnets of the first magnet 510 may be disposed to be positioned on a first circle C1 centered on the optical axis (Z axis), and each outer surface of the two magnets may be disposed to be positioned on a second circle C2 centered on the optical axis (Z axis).

The first circle C1 formed along the inner surface and the second circle C2 formed along the outer surface may be concentric circles.

The first coil 520 may also have a shape corresponding to the first magnet 510.

As an example, the first coil 520 has a shape having a hollow portion and has a round shape.

An inner portion (a portion facing the optical axis (Z axis)) and an outer portion (an opposite side of the inner portion) of the first coil 520 may be rounded (see FIGS. 10 and 12). The first coil 520 may have a ring shape having a hollow portion, and the outer portion thereof may be longer than the inner portion.

Each inner portion of the two coils of the first coil 520 may be disposed to be positioned on a third circle C3 centered on the optical axis (Z axis), and each outer portion of the two coils may also be disposed to be positioned on a fourth circle C4 centered on the optical axis (Z axis).

The third circle C3 formed along the inner portion and the fourth circle C4 formed along the outer portion may be concentric circles.

Referring to FIGS. 8 and 9, the first substrate 530 may be a flexible circuit board and may have a curved shape. For example, the first substrate 530 may have a curved shape.

The first substrate 530 includes a first connection part 531, a first support part 532, a second connection part 533, and a second support part 534.

The first connection part 531 is connected to the printed circuit board of the image sensor unit 4 and may be curved and extended from the printed circuit board. As an example, the first connection part 531 may have a shape bent from the printed circuit board in the direction of the optical axis (Z axis).

The first support part 532 may extend in a direction perpendicular to the optical axis (Z-axis) direction from the first connection part 531. The first support part 532 may be spaced apart from the printed circuit board in the optical axis (Z axis) direction.

The first coil 520 may be provided on the first support part 532. Accordingly, the first magnet 510 and the first coil 520 may face each other in the optical axis (Z axis) direction.

The second connection part 533 is connected to the first support part 532 and may be curvedly extended from the first support part 532. For example, the second connection part 533 may have a shape bent from the first support part 532 in the direction of the optical axis (Z axis).

The second support part 534 may extend in a direction perpendicular to the optical axis (Z-axis) direction from the second connection part 533. A connector may be provided at an outer end of the second support part 534. The first support 532 and the second support 534 may be spaced apart from each other in the optical axis (Z axis) direction.

Each of the first connection part 531 and the second connection part 533 may be in the form of a flexible film in which a conductor is patterned. Alternatively, the first connection part 531 and the second connection part 533 may each be in the form of a plurality of cables. Each of the first connection part 531 and the second connection part 533 may be bent multiple times.

When the first frame 100 is rotated about the optical axis (Z axis), a portion of the first substrate 530 may be bent in the rotation direction of the first frame 100. For example, the first connection part 531 may be bent in the rotation direction of the first frame 100.

In addition, when the second frame 200 is rotated based on the first axis (X axis), a portion of the first substrate 530 may be bent in the rotation direction of the second frame 100. As an example, the second connection part 533 may be bent in the rotation direction of the second frame 200.

In addition, when the third frame 300 is rotated based on the second axis (Y axis), a portion of the first substrate 530 may be bent in the rotation direction of the third frame 300. For example, the second connection part 533 may be bent in the rotation direction of the third frame 300.

A radius of curvature of the first connection part 531 may be smaller than a radius of curvature of the second connection part 533.

A first position measuring unit 540 may be provided on the first substrate 530 (see FIG. 12). As an example, the first position measurement unit 540 may be provided on the first support part 532 of the first substrate 530.

In an example, the first position measuring unit 540 may be disposed in the hollow portion of the first coil 520 to face the first magnet 510.

The first position measuring unit 540 includes a plurality of pattern coils. Each pattern coil may have a zigzag shape. For example, each pattern coil may be repeatedly bent. For example, each pattern coil may have a meander line shape.

Each pattern coil has a shape rounded in the rotation direction of the lens module 1 and the first frame 100.

As the first magnet 510 facing the first position measuring unit 540 is rotated, the inductance of the plurality of pattern coils is changed. Accordingly, the amount of rotation of the first magnet 510 may be detected from changes in inductance of the plurality of pattern coils, and accordingly, the position of the lens module 1 may be measured.

The plurality of pattern coils may include at least two pattern coils having different pitch intervals. Accordingly, since the inductance change amount varies for each pattern coil, more precise position measurement is possible.

In another example, the first position measuring unit 540 may further include a pattern coil 550 disposed between the two magnets of the first magnet 510. The pattern coil 550 may be disposed between the two coils of the first coil 520. Like the plurality of pattern coils, the pattern coil 550 may have a zigzag shape. For example, the pattern coil 550 may be repeatedly bent. For example, the pattern coil 550 may have a meandering line shape.

The pitch interval of the pattern coil 550 may be formed to be narrower than that of each of the plurality of pattern coils.

According to an example, the first position measuring unit 540 may include at least one of a plurality of pattern coils and pattern coils 550.

Alternatively, the first position measuring unit 540 may be provided as a Hall sensor disposed to face the first magnet 510.

Figure 13:
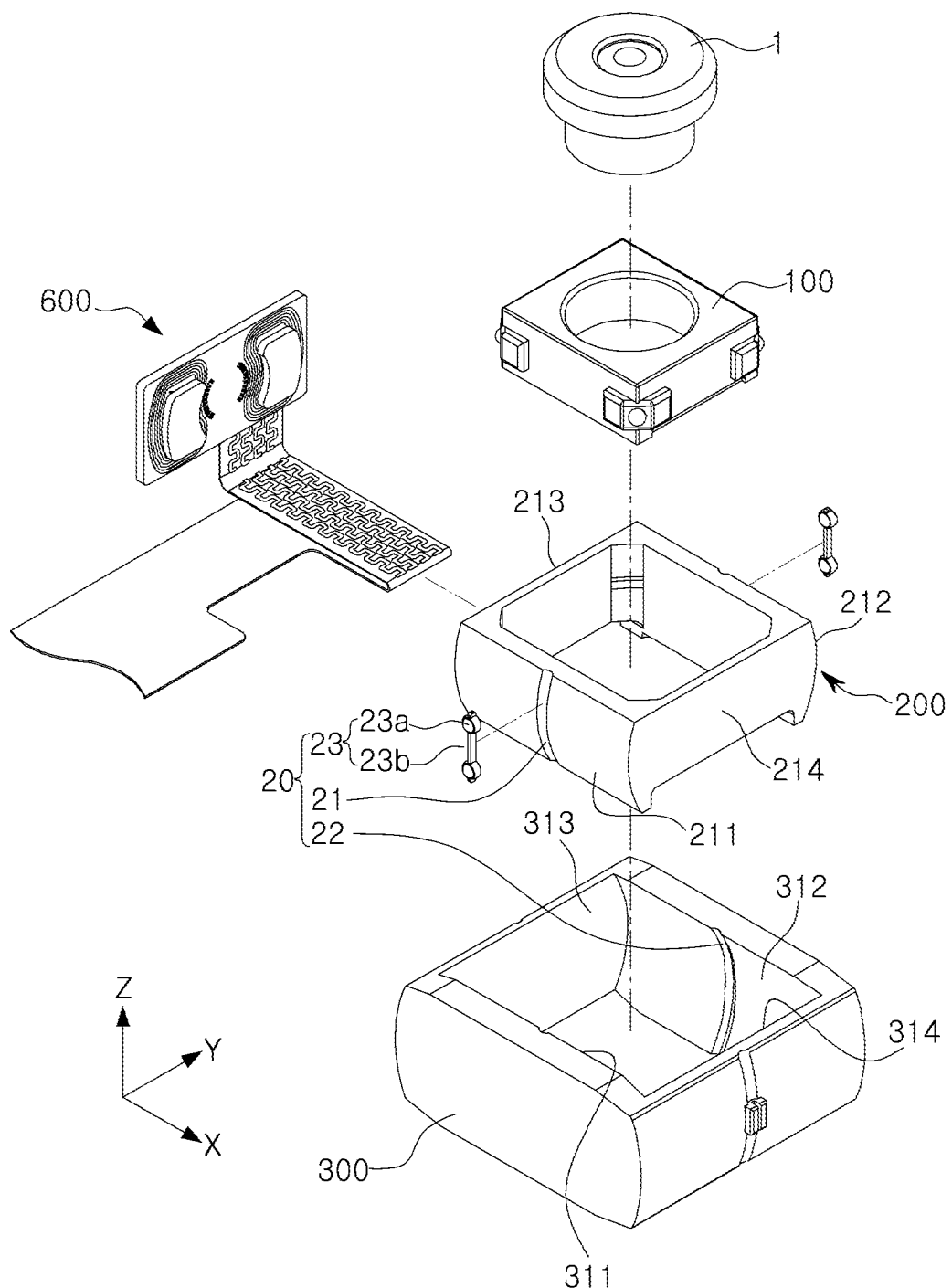
FIG. 13 is an exploded perspective view of a lens module, a first frame, a second frame and a third frame.
Figure 14:
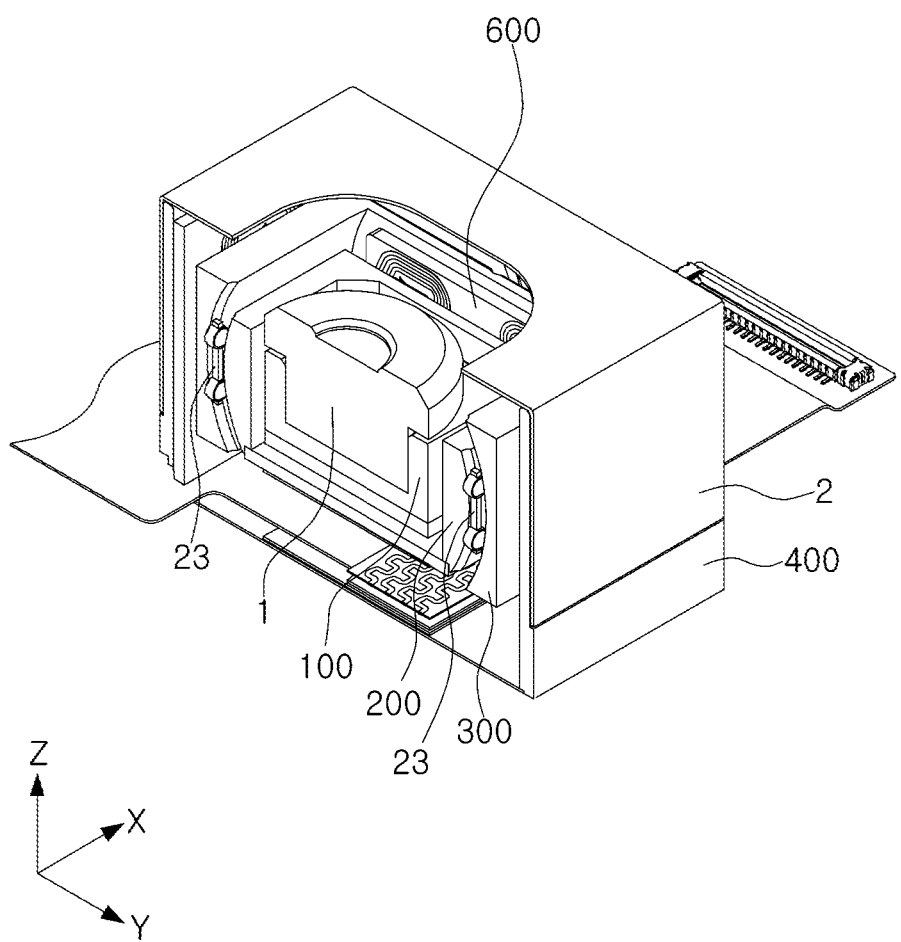
FIG. 14 is a cross-sectional perspective view taken along line I-I' of FIG. 3.
Figure 15:
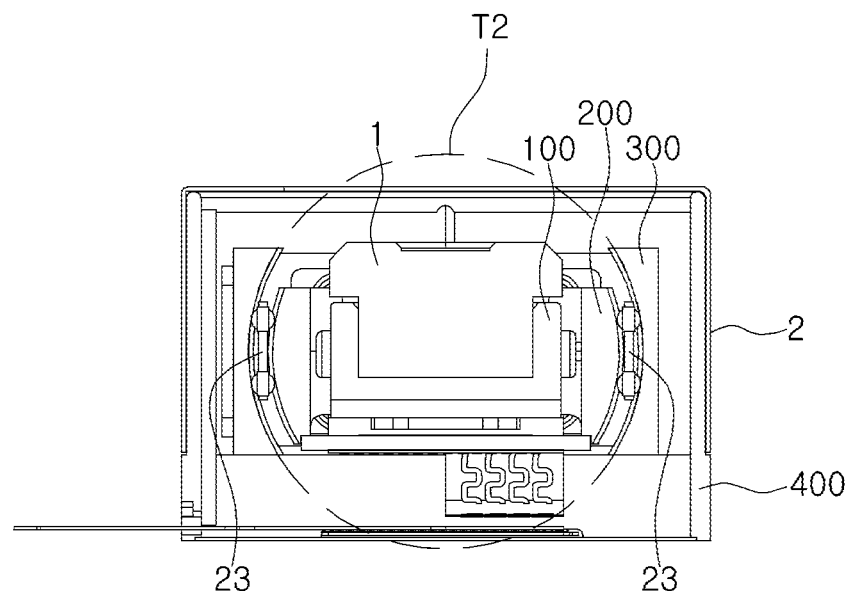
FIG. 15 is a cross-sectional view taken along line I-I' of FIG. 3.
Figure 15:
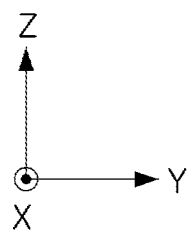

FIG. 13 is an exploded perspective view of a lens module, a first frame, a second frame, and a third frame, FIG. 14 is a cross-sectional perspective view taken along line I-I' of FIG. 3, and FIG. 15 is a cross-sectional view taken along line I-I' of FIG. 3.

Figure 16:
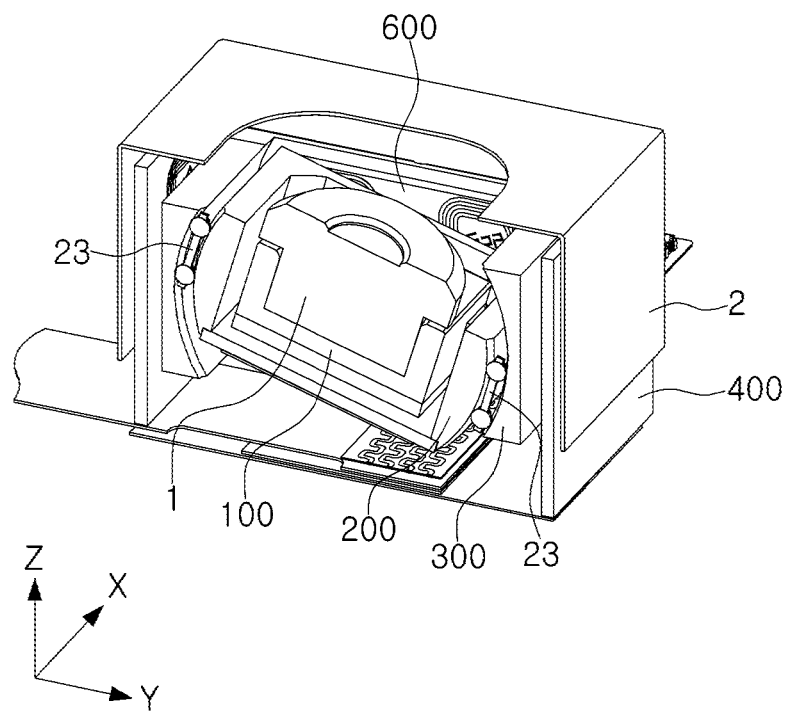
FIG. 16 is a view illustrating a state in which the lens module, the first frame and the second frame are rotated.

FIG. 16 is a view illustrating a state in which the lens module, the first frame and the second frame are rotated.

Figure 17:
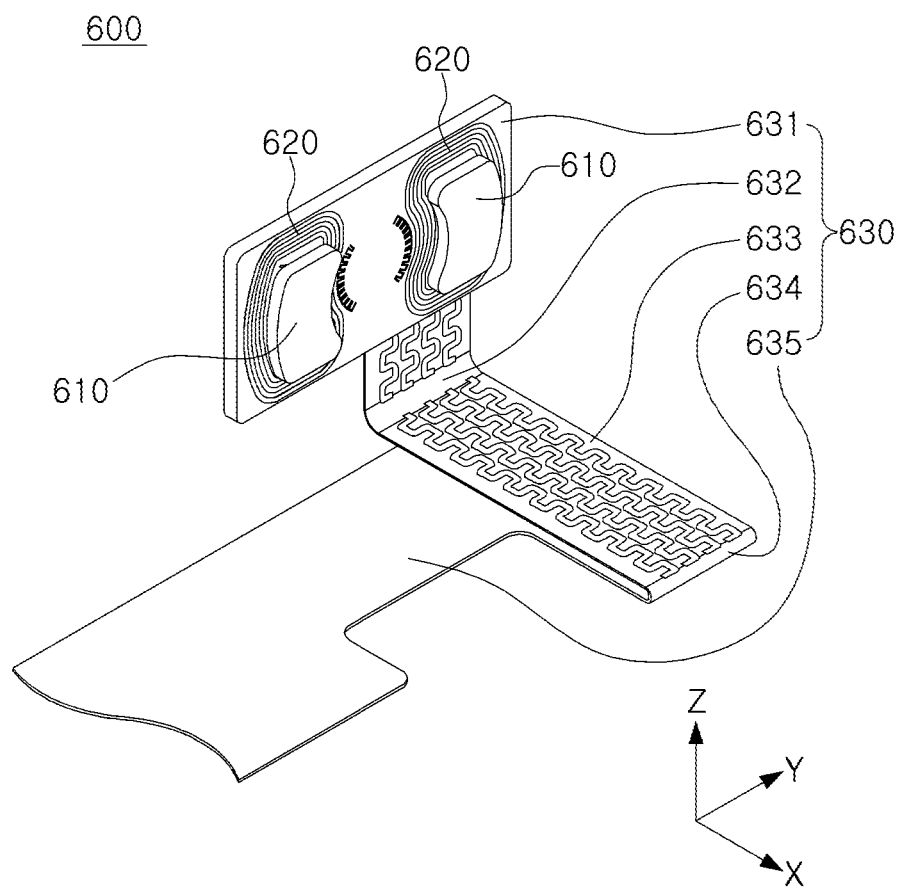
FIG. 17 is a perspective view of a second driving unit.
Figure 18:
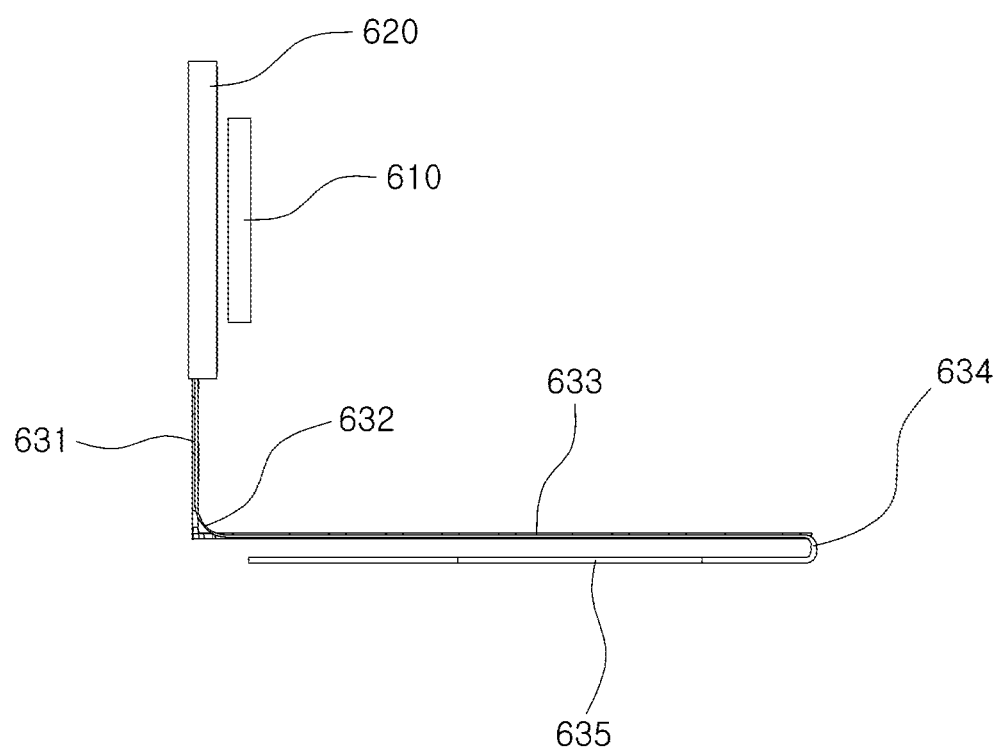
FIG. 18 is a side view of FIG. 17.

FIG. 17 is a perspective view of a second driving unit, and FIG. 18 is a side view of FIG. 17.

Referring to FIGS. 13 to 18, rotational motion (pitching) of the lens module 1, the first frame 100, and the second frame 200 based on the first axis (X axis) perpendicular to the optical axis (Z axis) will be described.

The lens module 1 is accommodated in the first frame 100, the first frame 100 is accommodated in the second frame 200, and the second frame 200 is accommodated in the third frame 300.

The second frame 200 is provided to be able to rotate relative to the third frame 300. Since the lens module 1 and the first frame 100 are accommodated in the second frame 200, the lens module 1 and the first frame 100 are also rotated by the rotation of the second frame 200. For example, the lens module 1 and the first frame 100 are rotated together with the second frame 200.

The lens module 1, the first frame 100 and the second frame 200 are provided to be able to rotate relative to the third frame 300. For example, the lens module 1, the first frame 100, and the second frame 200 may be rotatably supported with respect to the third frame 300. For example, the lens module 1, the first frame 100, and the second frame 200 may be rotated based on a first axis (X axis) perpendicular to the optical axis (Z axis) (pitch). For example, the second frame 200 may be rotated relative to the third frame 300 using the first axis (X axis) as a rotation axis.

The rotation range of the lens module 1, the first frame 100, and the second frame 200 may be ±30°. Also, the rotation range of the lens module 1, the first frame 100, and the second frame 200 may be ±20°.

A second guide portion 20 is provided between the second frame 200 and the third frame 300 to guide the rotational motion of the second frame 200. The second guide portions 20 are disposed in pairs on opposite sides with respect to the optical axis (Z axis).

The second guide portion 20 includes a second receiving groove 21, a second guide groove 22 and a second ball member 23.

The second receiving groove 21 is provided on the outer surface of the second frame 200. As an example, the outer surface of the second frame 200 includes a first outer surface 211, a second outer surface 212, a third outer surface 213 and a fourth outer surface 214. The first outer surface 211 and the second outer surface 212 are surfaces located opposite to each other with respect to the optical axis (Z axis), and the third outer surface 213 and the fourth outer surface 214 may be surfaces located opposite each other, based on the optical axes (Z axis). The first outer surface 211 and the second outer surface 212 may be surfaces perpendicular to the third outer surface 213 and the fourth outer surface 214.

The second receiving groove 21 may be provided on the first outer surface 211 and the second outer surface 212 of the second frame 200.

The first outer surface 211 and the second outer surface 212 of the second frame 200 may have a rounded shape. For example, the first outer surface 211 and the second outer surface 212 of the second frame 200 may include curved surfaces.

The second receiving groove 21 has a length in the rotation direction of the second frame 200, for example, an arc of a circle having the first axis (X axis) as a rotation axis, and has a round shape.

For example, the inner wall of the second receiving groove 21 in contact with the second ball member 23 has a curvature. The distance between the inner wall of the second receiving groove 21 and the first axis (X axis) in contact with the second ball member 23 may be constant.

The second guide groove 22 is provided on the inner surface of the third frame 300. As an example, the inner surface of the third frame 300 includes a first inner surface 311, a second inner surface 312, a third inner surface 313, and a fourth inner surface 314. The first inner surface 311 and the second inner surface 312 are surfaces located opposite to each other with respect to the optical axis (Z axis), and the third inner surface 313 and the fourth inner surface 314 may be surfaces located to be opposite to each other based on the optical axis (Z axis). The first inner surface 311 and the second inner surface 312 may be surfaces perpendicular to the third inner surface 313 and the fourth inner surface 314.

The second guide groove 22 may be provided on the first inner side 311 and the second inner side 312 of the third frame 300.

The first inner surface 311 and the second inner surface 312 of the third frame 300 may have a rounded shape. For example, the first inner surface 311 and the second inner surface 312 of the third frame 300 may include curved surfaces.

The second guide groove 22 has a length in the rotation direction of the second frame 200, for example, an arc of a circle having the first axis (X axis) as a rotation axis, and has a round shape.

For example, the inner wall of the second guide groove 22 in contact with the second ball member 23 has a curvature. The distance between the inner wall of the second guide groove 22 and the first axis (X-axis) in contact with the second ball member 23 may be constant.

The second ball member 23 is disposed between the second receiving groove 21 and the second guide groove 22.

The second ball member 23 includes a plurality of ball members 23a and a ball housing 23b. The plurality of ball members 23a are spaced apart from each other in the optical axis (Z axis) direction, and are inserted into the ball housing 23b.

The ball housing 23b may be in a bar shape having a length in the optical axis (Z axis) direction, and a plurality of ball members 23a may be mounted at both ends of the ball housing 23b.

The plurality of ball members 23a include at least one ball member disposed above and at least one ball member disposed below the center (center in the optical axis (Z-axis) direction) of the outer surface of the second frame 200. For example, the plurality of ball members 23a include at least one ball member disposed above and at least one ball member disposed below the first axis (X-axis), a rotation axis.

One side of the plurality of ball members 23a is in contact with the second receiving groove 21 and the other side is in contact with the second guide groove 22.

The ball housing 23b is fixedly disposed on the outer surface of the second frame 200, and a plurality of ball members 23a are provided so as to be rotatable with respect to the ball housing 23b and the second receiving groove 21.

The plurality of ball members 23a is provided to enable a rolling motion with respect to the second guide groove 22.

Therefore, the lens module 1, the first frame 100, and the second frame 200 are guided by the second guide portion 20 and are based on a first axis (X axis) perpendicular to the optical axis (Z axis).

In the present example, it has been described that the plurality of ball members 23a are capable of rotating with respect to the second receiving groove 21 and capable of rolling with respect to the second guide groove 22, but are not limited thereto. For example, the plurality of ball members 23a may be rolled with respect to the second receiving groove 21 and may be provided to rotate with respect to the second guide groove 22.

Alternatively, the plurality of ball members 23a may be provided so as to be capable of rolling with respect to the second receiving groove 21 and the second guide groove 22.

Alternatively, a plurality of ball members 23a may be fixed to the second receiving groove 21 to slide with respect to the second guide groove 22.

The second ball member 23 is located on the rotational trajectory of the second frame 200. For example, the plurality of ball members 23a of the second ball member 23 may all be located on one rotation trajectory T2 of the second frame 200 (see FIG. 15).

The plurality of ball members 23a of the second ball member 23 may be disposed on a rotation axis of the second frame 200, for example, in an arc of a circle centered on the first axis (X axis). For example, the plurality of ball members 23a of the second ball member 23 may be provided on a circle present in a plane perpendicular to the first axis (X axis) while being centered on the first axis (X axis).

The second driving unit 600 provides driving force to the second frame 200. As illustrated in FIGS. 17 and 18, the second driving unit 600 includes a second magnet 610, a second coil 620, and a second substrate 630.

The second magnet 610 is provided on the outer surface of the second frame 200. For example, the second magnet 610 may be provided on an outer surface of the second frame 200 on which the second guide portion 20 is not disposed. For example, the second magnet 610 may be provided on at least one of the third outer surface 213 and the fourth outer surface 214 of the second frame 200.

The second magnet 610 may include one or two magnets spaced apart from each other. When two magnets are included, they may be spaced apart in a direction perpendicular to the optical axis (Z axis) (e.g., in the second axis (Y axis) direction).

The second coil 620 may be provided on the second substrate 630 to face the second magnet 610. The second coil 620 may be a copper foil pattern stacked and buried in the second substrate 630, and may include one or two coils spaced apart from each other.

The second magnet 610 and the second coil 620 are disposed to face each other in a direction perpendicular to the optical axis (Z axis) (e.g., in the first axis (X axis) direction).

A driving force is generated in the direction of the optical axis (Z axis) due to electromagnetic influence between the second magnet 610 and the second coil 620.

Accordingly, the second frame 200 may be rotated based on a first axis (X axis) perpendicular to the optical axis (Z axis) by the driving force of the second driving unit 600. Since the lens module 1 and the first frame 100 are accommodated in the second frame 200, as the second frame 200 is rotated, the lens module 1 and the first frame 100 may be rotated with 200.

When the second frame 200 is rotated about the first axis (X axis), the second magnet 610 is a moving member that rotates together with the second frame 200, and the second coil 620 is fixed.

However, the configuration is not limited thereto, and positions of the second magnet 610 and the second coil 620 may be changed.

Since the shape of the second magnet 610 and the shape of the second coil 620 are the same as the shape of the first magnet 510 and the shape of the first coil 520 described above, a detailed description will be omitted.

The second substrate 630 may be disposed on the inner surface of the third frame 300. For example, the second substrate 630 may be disposed on at least one of the third inner surface 313 and the fourth inner surface 314 of the third frame 300.

The second substrate 630 may be a flexible circuit board and has a curved shape. For example, the second substrate 630 may have a curved shape. For example, the second substrate 630 may have a shape that is bent a plurality of times.

The second substrate 630 includes a first body portion 631, a first bent portion 632, a second body portion 633, a second bent portion 634 and a third body portion 635.

The second coil 620 may be provided in the first body portion 631. The first body portion 631 may be disposed on the inner surface of the third frame 300. For example, the first body portion 631 may be disposed on at least one of the third inner surface 313 and the fourth inner surface 314 of the third frame 300.

The first bent portion 632 may be curved and extended from the first body portion 631. For example, the first bent portion 632 may be curved in a direction substantially perpendicular to the optical axis (Z axis) from the first body portion 631.

The second body portion 633 may extend in a direction perpendicular to the optical axis (Z axis) from the first bent portion 632.

The second bent portion 634 may be curved and extended from the second body portion 633. For example, the second bent portion 634 may have a shape bent from the second body portion 633 in the direction of the optical axis (Z axis).

The third body portion 635 may extend from the second bent portion 634 in a direction perpendicular to the optical axis (Z axis). The second body portion 633 and the third body portion 635 may be spaced apart from each other in the optical axis (Z axis) direction.

Each of the first bent portion 632, the second body portion 633, the second bent portion 634, and the third body portion 635 may have a flexible film shape in which a conductor is patterned.

The second substrate 630 is disposed on the inner surface of the third frame 300, and the third frame 300 is configured to rotate about a second axis (Y axis). When the third frame 300 is rotated, a portion of the second substrate 630 may be bent in the rotation direction of the third frame 300. For example, the first bent portion 632, the second body portion 633, and the second bent portion 634 may be bent in the rotation direction of the third frame 300.

In another example, the second substrate 630 may be provided in a form in which a plurality of cables extends from the first body portion 631.

A second position measuring unit may be provided on the second substrate 630. Since the configuration of the second position measuring unit is the same as the configuration of the first position measuring unit, a detailed description will be omitted.

Figure 19:
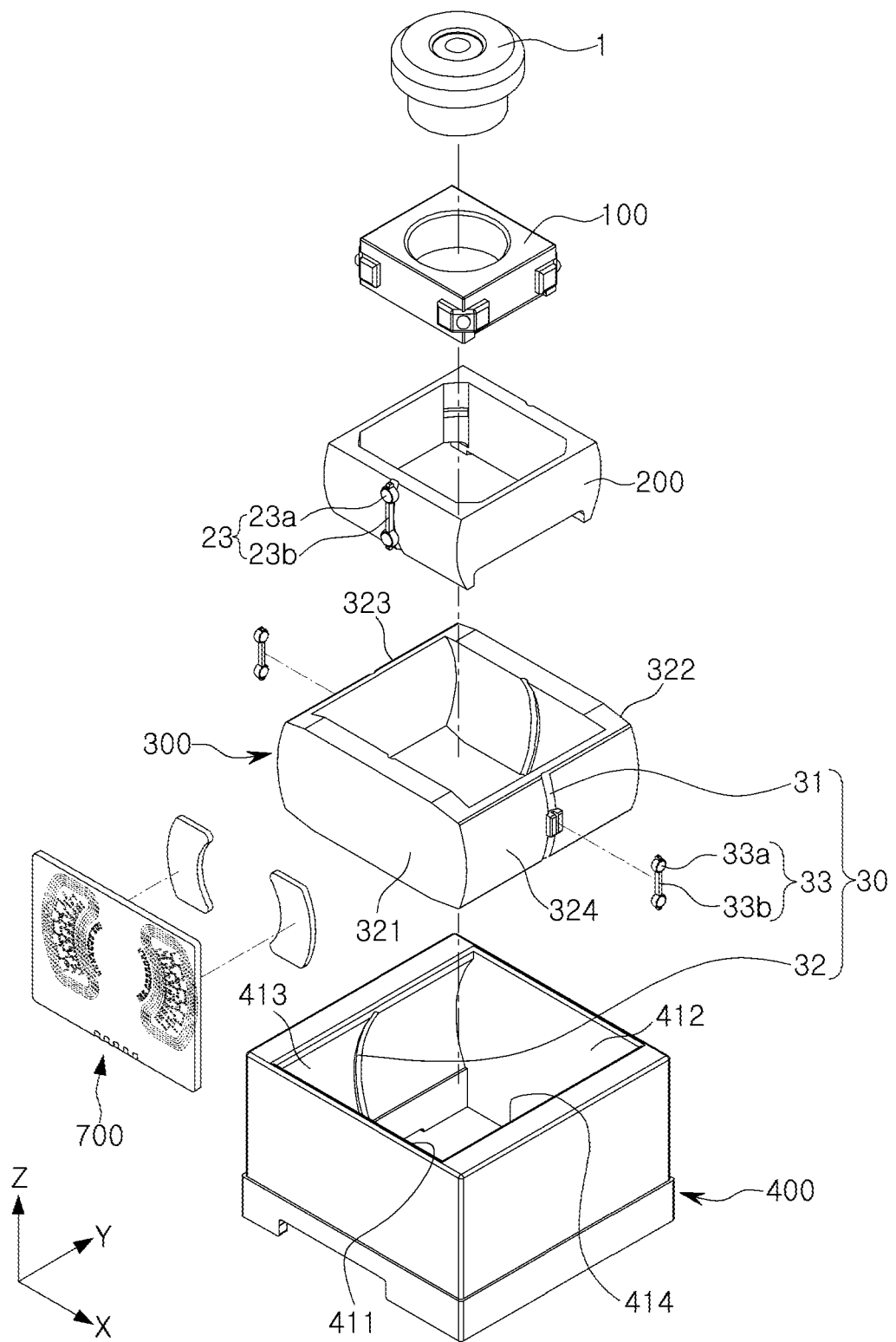
FIG. 19 is an exploded perspective view of a lens module, a first frame, a second frame, a third frame, and a housing.
Figure 20:
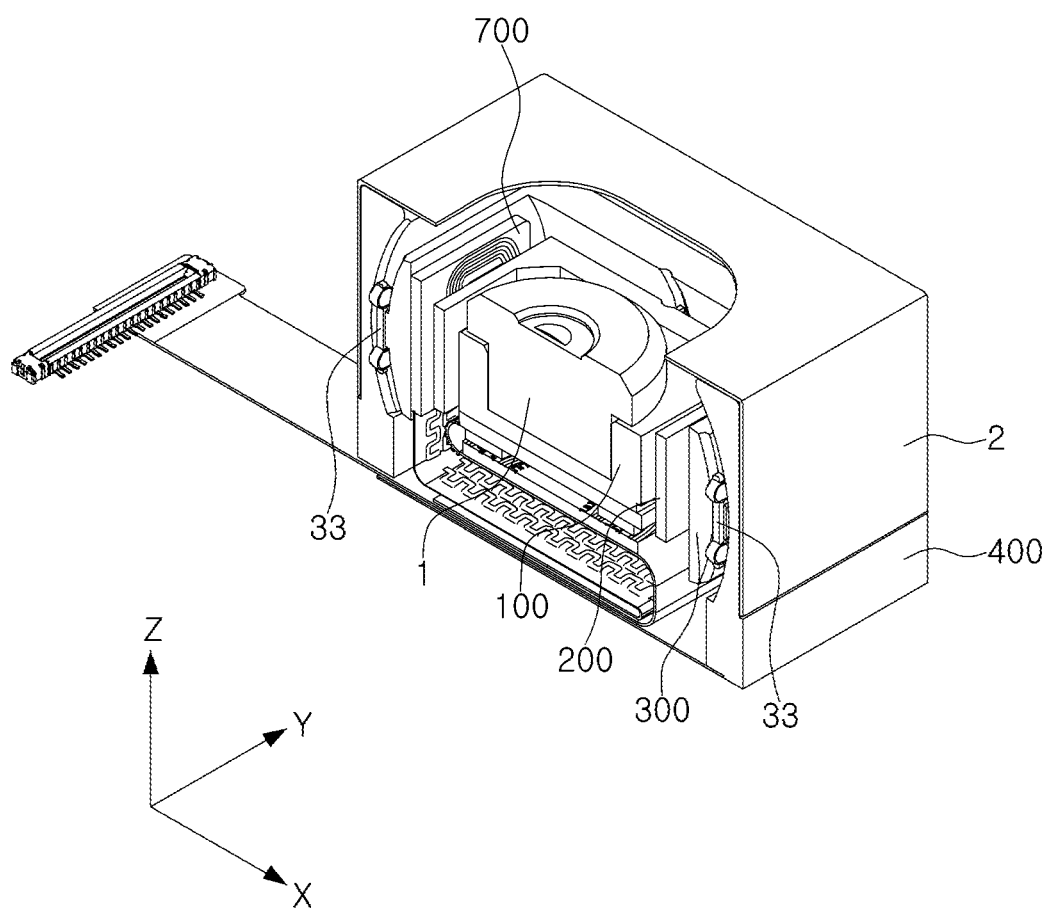
FIG. 20 is a cross-sectional perspective view taken along line II-II' of FIG. 3.
Figure 21:
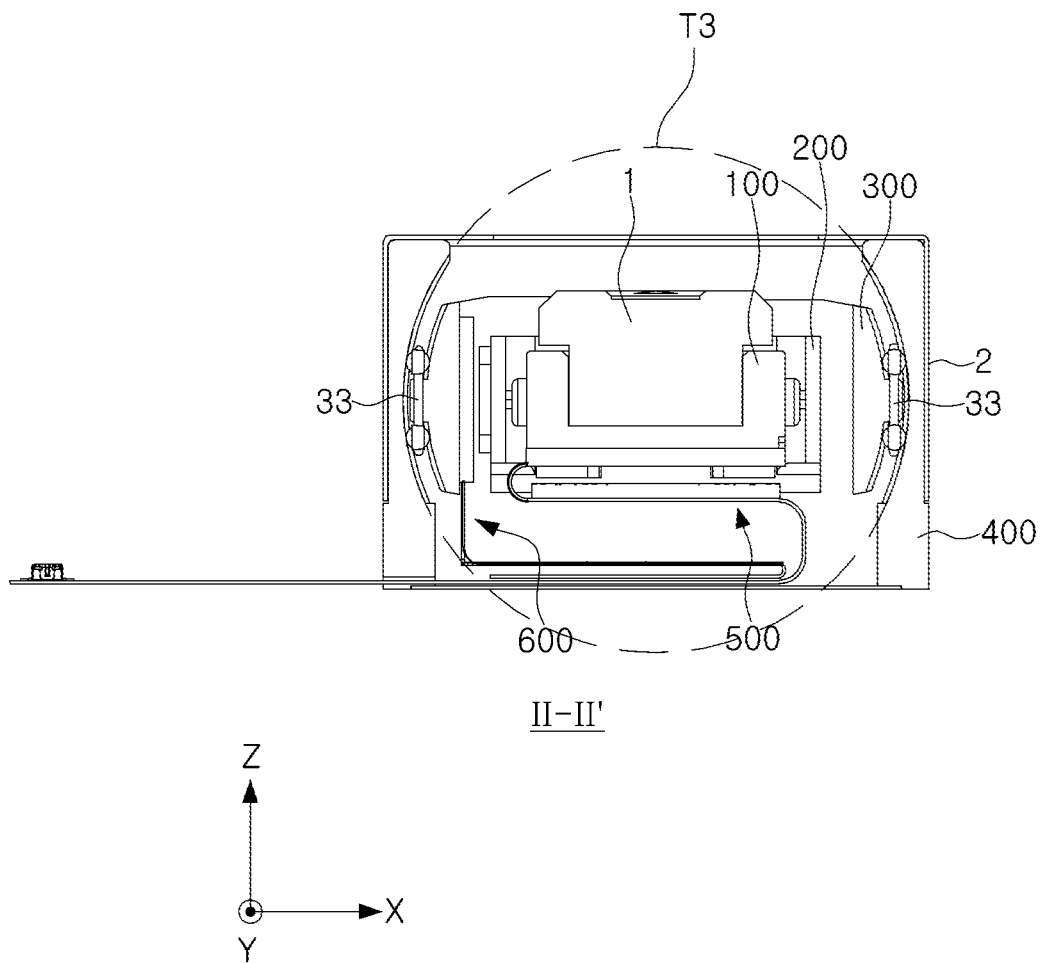
FIG. 21 is a cross-sectional view taken along line II-II' of FIG. 3.

FIG. 19 is an exploded perspective view of a lens module, a first frame, a second frame, a third frame, and a housing, FIG. 20 is a cross-sectional perspective view of II-II' of FIG. 3, and FIG. 21 is of II-II' of FIG.

Figure 22:
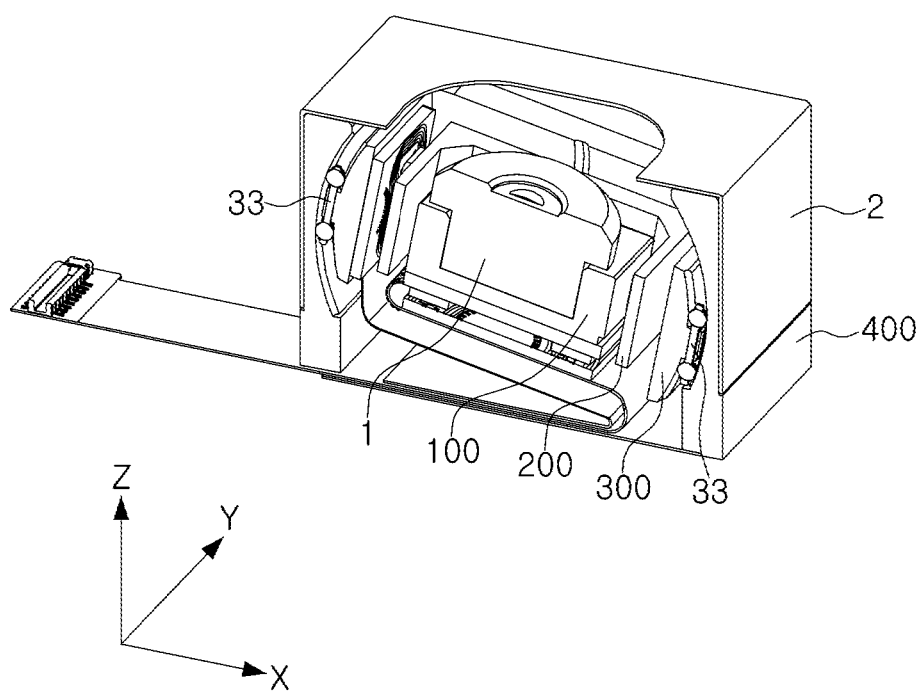
FIG. 22 is a diagram illustrating a state in which a lens module, a first frame, a second frame, and a third frame are rotated.

FIG. 22 is a diagram illustrating a state in which a lens module, a first frame, a second frame, and a third frame are rotated.

Figure 23:
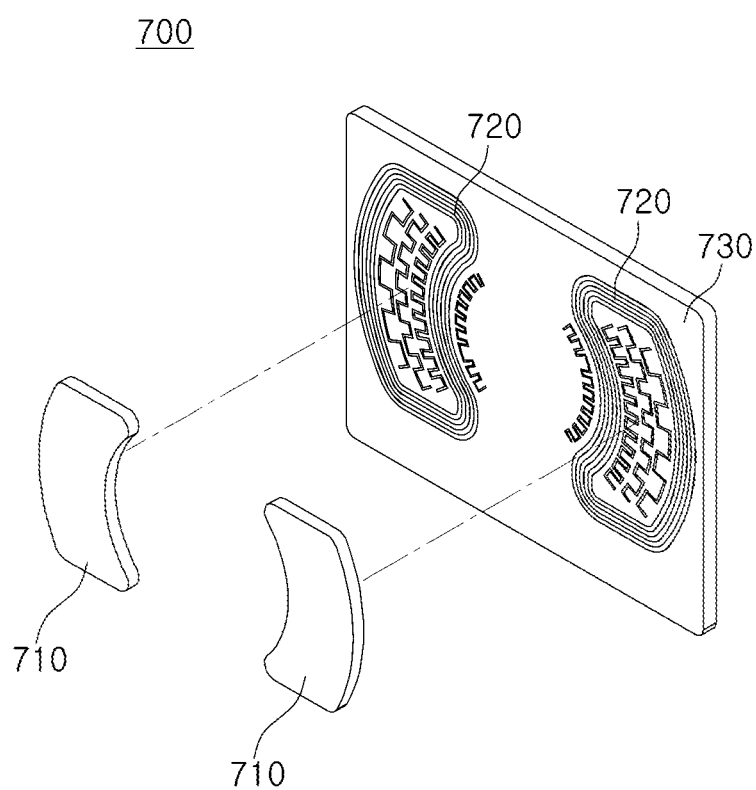
FIG. 23 is a perspective view of a third driving unit.

FIG. 23 is a perspective view of a third driving unit.

Referring to FIGS. 19 to 23, a lens module 1, a first frame 100 based on a second axis (Y axis) perpendicular to both the optical axis (Z axis) and the first axis (X axis), The rotational motion (yaw) of the second frame 200 and the third frame 300 will be described.

The lens module 1 is accommodated in the first frame 100, the first frame 100 is accommodated in the second frame 200, the second frame 200 is accommodated in the third frame 300, the third frame 300 is accommodated in the housing 400.

The third frame 300 is provided to be able to rotate relative to the housing 400. Since the lens module 1, the first frame 100, and the second frame 200 are accommodated in the third frame 300, the lens module 1 and the first frame are rotated by the rotation of the third frame 300, and the second frame 200 is also rotated. For example, the lens module 1, the first frame 100 and the second frame 200 are rotated together with the third frame 300.

The lens module 1, the first frame 100, the second frame 200, and the third frame 300 are provided to be relatively rotatable with respect to the housing 400. For example, the lens module 1, the first frame 100, the second frame 200, and the third frame 300 may be rotatably supported with respect to the housing 400. For example, the lens module 1, the first frame 100, the second frame 200 and the third frame 300 are a second axis perpendicular to both the optical axis (Z axis) and the first axis (X axis) It may be rotated based on (Y-axis) (yaw). For example, the third frame 300 may be rotated relative to the housing 400 using the second axis (Y axis) as a rotation axis.

The rotation range of the lens module 1, the first frame 100, the second frame 200, and the third frame 300 may be ±30°. Also, the rotation range of the lens module 1, the first frame 100, the second frame 200, and the third frame 300 may be ±20°.

A third guide portion 30 is provided between the third frame 300 and the housing 400 to guide the rotational movement of the third frame 300. The third guide portions 30 are disposed in pairs on opposite sides of the optical axis (Z axis).

When viewed from the optical axis (Z-axis) direction, the pair of second guide portions 20 and the pair of third guide portions 30 may be disposed at positions perpendicular to each other.

The third guide portion 30 includes a third receiving groove 31, a third guide groove 32 and a third ball member 33.

The third receiving groove 31 is provided on the outer surface of the third frame 300. For example, the outer surface of the third frame 300 includes a first outer surface 321, a second outer surface 322, a third outer surface 323, and a fourth outer surface 324. The first outer surface 321 and the second outer surface 322 are surfaces located opposite to each other with respect to the optical axis (Z axis), and the third outer surface 323 and the fourth outer surface 324 may be surfaces located to be opposite to each other based on the optical axis (Z axis). The first outer surface 321 and the second outer surface 322 may be surfaces perpendicular to the third outer surface 323 and the fourth outer surface 324.

The third receiving groove 31 may be provided on the first outer surface 321 and the second outer surface 322 of the third frame 300.

The first outer surface 321 and the second outer surface 322 of the third frame 300 may have a rounded shape. For example, the first outer surface 321 and the second outer surface 322 of the third frame 300 may include curved surfaces.

The third receiving groove 31 has a length in the rotation direction of the third frame 300, for example, an arc of a circle having the second axis (Y axis) as a rotation axis, and has a round shape.

As an example, the inner wall of the third receiving groove 31 in contact with the third ball member 33 has a curvature. The distance between the inner wall of the third receiving groove 31 and the second axis (Y axis) in contact with the third ball member 33 may be constant.

The third guide groove 32 is provided on the inner surface of the housing 400. As an example, the inner surface of the housing 400 includes a first inner surface 411, a second inner surface 412, a third inner surface 413, and a fourth inner surface 414.

The first inner surface 411 and the second inner surface 412 are surfaces located opposite to each other with respect to the optical axis (Z axis), and the third inner surface 413 and the fourth inner surface 414 are optical axes (Z). It may be a plane located opposite each other based on the axis). The first inner surface 411 and the second inner surface 412 may be surfaces perpendicular to the third inner surface 413 and the fourth inner surface 414.

The third guide groove 32 may be provided on the first inner surface 411 and the second inner surface 412 of the housing 400.

The first inner surface 411 and the second inner surface 412 of the housing 400 may have a rounded shape. For example, the first inner surface 411 and the second inner surface 412 of the housing 400 may include curved surfaces.

The third guide groove 32 has a length in the rotation direction of the third frame 300 and has a round shape.

For example, the inner wall of the third guide groove 32 in contact with the third ball member 33 has a curvature. The distance between the inner wall of the third guide groove 32 and the second axis (Y axis) in contact with the third ball member 33 may be constant.

The third ball member 33 is disposed between the third receiving groove 31 and the third guide groove 32.

The third ball member 33 includes a plurality of ball members 33a and a ball housing 33b. The plurality of ball members 33a are spaced apart from each other in the optical axis (Z axis) direction, and are inserted into the ball housing 33b.

The ball housing 33b may have a bar shape having a length in the optical axis (Z axis) direction, and a plurality of ball members 33a may be mounted at both ends of the ball housing 33b.

The plurality of ball members 33a include at least one ball member disposed above and at least one ball member disposed below the center (center in the optical axis (Z-axis) direction) of the outer surface of the third frame 300. It includes a ball member. For example, the plurality of ball members 33a include at least one ball member disposed above and at least one ball member disposed below the second axis (Y-axis), a rotation axis.

One side of the plurality of ball members 33a is in contact with the third receiving groove 31 and the other side is in contact with the third guide groove 32.

The ball housing 33b is fixedly disposed on the outer surface of the third frame 300, and a plurality of ball members 33a are provided to be rotatable with respect to the ball housing 33b and the third receiving groove 31.

In addition, a plurality of ball members 33a is provided to enable a rolling motion with respect to the third guide groove 32.

Accordingly, the lens module 1, the first frame 100, the second frame 200, and the third frame 300 are guided by the third guide portion 30 to be guided by the second axis (Y axis).

In the present example, it has been described that the plurality of ball members 33a are capable of rotating with respect to the third receiving groove 31 and capable of rolling with respect to the third guide groove 32, but the configuration is not limited thereto. For example, the plurality of ball members 33a may be provided to be capable of rolling with respect to the third receiving groove 31 and capable of rotating with respect to the third guide groove 32.

Alternatively, the plurality of ball members 33a may be provided so as to be capable of rolling with respect to the third receiving groove 31 and the third guide groove 32.

Alternatively, a plurality of ball members 33a may be fixed to the third receiving groove 31 to slide with respect to the second guide groove 32.

The third ball member 33 is positioned on the rotation trajectory of the third frame 300. For example, the plurality of ball members 33a of the third ball member 33 may all be positioned on one rotation trajectory T3 of the third frame 300 (see FIG. 21).

The plurality of ball members 33a of the third ball member 33 may be disposed on a rotation axis of the third frame 300, for example, in an arc of a circle centered on the second axis (Y axis). For example, the plurality of ball members 33a of the third ball member 33 may be provided on a circle present in a plane perpendicular to the second axis (Y axis) while being centered on the second axis (Y axis).

The third driving unit 700 provides driving force to the third frame 300. The third driving unit 700 includes a third magnet 710, a third coil 720, and a third substrate 730.

The third magnet 710 is provided on the outer surface of the third frame 300. For example, the third magnet 710 may be provided on an outer surface of the third frame 300 on which the third guide portion 30 is not disposed. For example, the third magnet 710 may be provided on at least one of the third outer surface 323 and the fourth outer surface 324 of the third frame 300.

The third magnet 710 may include one or two magnets spaced apart from each other. When two magnets are included, they may be spaced apart from each other in a direction perpendicular to the optical axis (Z axis) (e.g., in the first axis (X axis) direction).

The third coil 720 may be provided on the third substrate 730 to face the third magnet 710. The third coil 720 may be a copper foil pattern stacked and buried in the third substrate 730, and may include one or two coils spaced apart from each other.

The third magnet 710 and the third coil 720 are disposed to face each other in a direction perpendicular to the optical axis (Z axis) (e.g., in the second axis (Y axis) direction).

A driving force is generated in the optical axis (Z axis) direction due to electromagnetic influence between the third magnet 710 and the third coil 720.

Accordingly, the third frame 300 may be rotated based on the second axis (Y-axis) by the driving force of the third driving unit 700. Since the lens module 1, the first frame 100, and the second frame 200 are accommodated in the third frame 300, the lens module 1 and the first frame are rotated as the third frame 300 is rotated. The first frame 100 and the second frame 200 may be rotated together with the third frame 300.

The third magnet 710 is a moving member that rotates together with the third frame 300, and the third coil 720 is a fixed member.

However, the configuration is not limited thereto, and positions of the third magnet 710 and the third coil 720 may be changed.

Since the shape of the third magnet 710 and the shape of the third coil 720 are the same as the shape of the first magnet 510 and the shape of the first coil 520 described above, detailed descriptions will be omitted.

The third substrate 730 may be disposed on the inner surface of the housing 400. For example, the third substrate 730 may be disposed on at least one of the third inner surface 413 and the fourth inner surface 414 of the housing 400.

A third position measuring unit may be provided on the third substrate 730. Since the configuration of the third position measuring unit is the same as the configuration of the first position measuring unit, a detailed description will be omitted.

In the camera module according to an example, since the lens module 1 is provided to be rotatable based on three axes perpendicular to each other, it is possible to track the movement of the subject of interest, and may correct shaking that may occur during shooting.

As set forth above, a camera module and a portable electronic device including the same, according to various examples, may track a moving subject and correct shaking.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a lens module;
a first frame accommodating the lens module;
a second frame accommodating the first frame;
a third frame accommodating the second frame; and
a housing accommodating the third frame,
wherein the lens module and the first frame are configured to rotate with respect to the second frame around an optical axis,
the lens module, the first frame and the second frame are configured to rotate with respect to the third frame around a first axis that is perpendicular to the optical axis, and
the lens module, the first frame, the second frame, and the third frame are configured to rotate with respect to the housing around a second axis that is perpendicular to both the optical axis and the first axis.

2. The camera module of claim 1, further comprising a first guide portion disposed between the first frame and the second frame,
wherein the first guide portion comprises:
a first receiving groove disposed in the first frame, a first guide groove disposed in the second frame, and a first ball member disposed between the first receiving groove and the first guide groove.

3. The camera module of claim 2, wherein an inner wall of at least one of the first receiving groove and the first guide groove has a rounded shape and a length in a rotation direction of the first frame.

4. The camera module of claim 1, further comprising a first driving unit configured to provide driving force to the first frame,
wherein the first driving unit comprises a first magnet disposed on an image side of the first frame, a first coil facing the first magnet in a direction of the optical axis, and a first substrate on which the first coil is disposed.

5. The camera module of claim 4, wherein the first magnet has an inner surface facing the optical axis and an outer surface opposite to the inner surface, the inner surface and the outer surface having a rounded shape, and
the first coil has an inner portion facing the optical axis and an outer portion opposite the inner portion, the inner portion and the outer portion having a rounded shape.

6. The camera module of claim 5, further comprising a first position measuring unit disposed to face the first magnet,
wherein the first position measuring unit comprises a plurality of pattern coils bent respectively and repeatedly.

7. The camera module of claim 4, wherein the first substrate comprises a connection portion connected to an image sensor unit disposed on the image side of the first frame and having a bent shape.

8. The camera module of claim 1, further comprising a second guide portion disposed between the second frame and the third frame,
wherein the second guide portion comprises:
a second receiving groove disposed in the second frame, a second guide groove disposed in the third frame, and a second ball member disposed between the second receiving groove and the second guide groove, and
the second guide portion is provided as a pair of second guide portions disposed on opposite sides of the optical axis.

9. The camera module of claim 8, wherein each of the second receiving groove and the second guide groove has a length in a rotation direction of the second frame and has a rounded shape.

10. The camera module of claim 8, wherein the second ball member comprises at least one first ball member disposed on a first side of the first axis and at least one second ball member disposed on a second side of the first axis.

11. The camera module of claim 10, wherein the second ball member is disposed on an arc of a circle centered on the first axis.

12. The camera module of claim 1, further comprising a second driving unit configured to provide driving force to the second frame,
wherein the second driving unit comprises a second magnet disposed on the second frame, a second coil facing the second magnet in a direction perpendicular to the optical axis, and a second substrate on which the second coil is disposed.

13. The camera module of claim 12, wherein the second substrate is bent a plurality of times.

14. The camera module of claim 1, further comprising a third guide portion disposed between the third frame and the housing,
wherein the third guide portion comprises:
a third receiving groove disposed on the third frame, a third guide groove disposed in the housing, and a third ball member disposed between the third receiving groove and the third guide groove, and
the third guide portion is provided as a pair of third guide portions disposed on opposite sides of the optical axis.

15. The camera module of claim 14, wherein each of the third receiving groove and the third guide groove has a length in a rotation direction of the third frame with the second axis and has a rounded shape.

16. The camera module of claim 14, wherein the third ball member comprises at least one first ball member disposed on a first side of the second axis and at least one second ball member disposed on a second side of the second axis.

17. The camera module of claim 16, wherein the third ball member is disposed on an arc of a circle centered on the second axis.

18. The camera module of claim 1, further comprising a third driving unit configured to provide driving force to the third frame,
wherein the third driving unit comprises a third magnet disposed on the third frame, a third coil facing the third magnet in a direction perpendicular to the optical axis, and a third substrate on which the third coil is disposed.

19. A portable electronic device comprising:
a first camera module; and
a second camera module spaced apart from the first camera module,
wherein an angle of view of the first camera module is narrower than an angle of view of the second camera module, and
the first camera module comprises:
a lens module;
a first frame accommodating the lens module and configured to rotate together with the lens module with respect to an optical axis;
a second frame accommodating the first frame and configured to rotate together with the first frame with respect to a first axis that is perpendicular to the optical axis;
a third frame accommodating the second frame and configured to rotate together with the second frame with respect to a second axis that is perpendicular to both the optical axis and the first axis; and
a housing accommodating the third frame.

20. A camera module comprising:
a lens module;
a first frame accommodating the lens module and configured to rotate together with the lens module around a first axis by virtue of a first set of ball members;
a second frame accommodating the first frame and configured to rotate together with the lens module and the first frame around a second axis by virtue of a second set of ball members;
a third frame accommodating the second frame and configured to rotate together with the lens module, the first frame, and the second frame around a third axis by virtue of a third set of ball members; and
a housing accommodating the third frame.

21. The camera module of claim 20, wherein the first axis is perpendicular to the second axis and the third axis, the second axis is perpendicular to the third axis, and one of the first axis, the second axis, and the third axis is an optical axis of the lens module.

22. The camera module of claim 20, wherein the second set of ball members is configured to roll between at least two curved outer surfaces of the second frame and two corresponding inner surfaces of the third frame.

23. The camera module of claim 22, wherein the third set of ball members is configured to roll between at least two curved outer surfaces of the third frame and two corresponding inner surfaces of the housing.

* * * * *